US012567318B2

(12) United States Patent
Hou et al.

(10) Patent No.: US 12,567,318 B2
(45) Date of Patent: Mar. 3, 2026

(54) HELMET, METHOD AND SERVER FOR DETECTING A LIKELIHOOD OF AN ACCIDENT

(71) Applicant: GRABTAXI HOLDINGS PTE. LTD., Singapore (SG)

(72) Inventors: Shuangquan Hou, Singapore (SG); Zhixin Yu, Singapore (SG); Alexis Zheng, Singapore (SG)

(73) Assignee: GRABTAXI HOLDINGS PTE. LTD, Singapore (SG)

( * ) Notice: Subject to any disclaimer, the term of this patent is extended or adjusted under 35 U.S.C. 154(b) by 24 days.

(21) Appl. No.: 17/927,334

(22) PCT Filed: Jul. 29, 2021

(86) PCT No.: PCT/SG2021/050442
§ 371 (c)(1),
(2) Date: Nov. 22, 2022

(87) PCT Pub. No.: WO2022/010423
PCT Pub. Date: Jan. 13, 2022

(65) Prior Publication Data
US 2023/0298456 A1 Sep. 21, 2023

(30) Foreign Application Priority Data
Aug. 1, 2020 (SG) .......................... 10202007345Y

(51) Int. Cl.
*G08B 25/01* (2006.01)
*G08B 21/04* (2006.01)

(52) U.S. Cl.
CPC ....... *G08B 25/016* (2013.01); *G08B 21/0446* (2013.01)

(58) Field of Classification Search
CPC .......................... G08B 25/016; G08B 21/0446
(Continued)

(56) References Cited

U.S. PATENT DOCUMENTS 9,445,639 B1 * 9/2016 Aloumanis ............ G06F 3/147
2010/0085171 A1 4/2010 Do
(Continued)

FOREIGN PATENT DOCUMENTS

IN 201741046325 6/2019
IN 201941045724 11/2019
(Continued)

OTHER PUBLICATIONS

Machine translation (Year: 2006).*
International Application No. PCT/SG2021/050442, "International Search Report" Oct. 20, 2021, 3 pages.

*Primary Examiner* — Naomi J Small
(74) *Attorney, Agent, or Firm* — Buckley, Maschoff & Talwalkar LLC

(57) ABSTRACT

The present invention relates generally to a helmet, method and server for detecting a likelihood of an accident. According to a first aspect, the present disclosure refers to a helmet of detecting a likelihood of an accident, comprising: a sensor configured to detect a signal relating to a user wearing the helmet, the signal including information at a point in time for the user; and a processor configured to communicate with the sensor and to: determine if there is the likelihood of the accident in response to receiving the signal: generate an alert signal in response to the determination, the alert signal indicating there is the likelihood of the accident.

17 Claims, 14 Drawing Sheets

(58) Field of Classification Search
USPC ........................................................ 340/573.1
See application file for complete search history.

(56) References Cited

U.S. PATENT DOCUMENTS

| | | | | |
|---|---|---|---|---|
| 2014/0348484 | A1* | 11/2014 | Erwin .................... | A42B 3/042 386/223 |
| 2016/0044276 | A1* | 2/2016 | Shearman .............. | A42B 3/042 348/207.1 |
| 2016/0309827 | A1* | 10/2016 | Dodson ................ | A42B 3/0426 |
| 2016/0358468 | A1* | 12/2016 | McGavran ....... | G08G 1/096827 |
| 2016/0368492 | A1* | 12/2016 | Al-Stouhi ............. | B60W 30/09 |
| 2017/0221345 | A1* | 8/2017 | Chen .................... | G08B 21/043 |
| 2017/0299396 | A1* | 10/2017 | Liang ...................... | G01S 19/40 |
| 2019/0045867 | A1* | 2/2019 | Zukowski ............... | H04W 4/90 |
| 2020/0256687 | A1* | 8/2020 | Körner ............... | G01C 21/3415 |
| 2021/0045486 | A1* | 2/2021 | Park ..................... | G08B 25/016 |
| 2021/0166558 | A1* | 6/2021 | Giraud ................. | G08G 1/0133 |
| 2022/0065639 | A1* | 3/2022 | Mistele .............. | G01C 21/3446 |

FOREIGN PATENT DOCUMENTS

| | | | | |
|---|---|---|---|---|
| KR | 2006-0089503 | | 8/2006 | |
| KR | 20060089503 | A * | 8/2006 | .............. H04M 3/42 |
| KR | 2010-0089911 | | 8/2010 | |
| KR | 2019-0006624 | | 1/2019 | |

* cited by examiner

HELMET, METHOD AND SERVER FOR DETECTING A LIKELIHOOD OF AN ACCIDENT

CROSS-REFERENCE TO RELATED APPLICATIONS

The present application is the U.S. National Stage of International Application No. PCT/SG2021/050442, filed on Jul. 29, 2021, which claims priority from Singapore patent application Ser. No. 10/202,007345Y filed on 1 Aug. 2020. The contents of each of these applications are incorporated herein by reference.

TECHNICAL FIELD

The present invention relates generally to a helmet, method and server for detecting a likelihood of an accident.

BACKGROUND

Helmet users like motorcycle drivers, race car drivers, go-cart drivers and others frequently wear a helmet on their heads to protect themselves from traumatic head injuries. There are other conventional helmets that provide additional functions that allow a user to make a telephone call or listen to music. While these helmets serve the function of protecting heads from sustaining the full impact in a collision or additional entertainment functions, they may impede the user's ability to see or perhaps hear potential dangers approaching, particularly from behind.

Accidents happen among motorcycle drivers, race car drivers, go-cart drivers and others and sometimes result in fatality when help is not rendered in a timely manner. Also, injuries for motorcycle drivers are more likely to be critical because it is difficult for the motorcycle drivers to take off their helmets to call for help.

A need therefore exists to provide helmets, methods and servers for detecting a likelihood of an accident that seek to address the above-mentioned problems.

SUMMARY

Disclosed are arrangements which seek to address one or more of the above problems by providing a helmet for detecting a likelihood of an accident using travel co-ordination protocols over a travel co-ordination network. The disclosed arrangements can also be used to managing an emergency procedure in conjunction with receiving an alert signal indicative of the likelihood of the accident.

The present disclosure enables a user to establish a user identity for a ride or vehicle, where the user identity is identifiable with an identifier. The system according to the present disclosure also manages the alert signal according to pre-configured protocols.

The system enables a travel co-ordination server to process an identifier to co-ordinate travel requests and alert signals.

According to a first aspect, the present disclosure refers to a helmet for detecting a likelihood of an accident, comprising: a sensor configured to detect a signal relating to a user wearing the helmet, the signal including information at a point in time for the user; and a processor configured to communicate with the sensor and to: determine if there is the likelihood of the accident in response to receiving the signal; generate an alert signal in response to the determination, the alert signal indicating there is the likelihood of the accident; wherein the helmet further comprises an input sensor configured to detect a signal indicative of a start of a trip by the user.

According to a second aspect, the present disclosure refers to a method of detecting a likelihood of an accident, comprising: detecting, by a sensor, a signal relating to a user wearing a helmet, the signal including information at a point in time for the user; and determining, by a processor, if there is the likelihood of the accident in response to receiving the signal; generating, by the processor, an alert signal in response to the determination, wherein the sensor and the processor are located on the helmet; wherein the method further comprises detecting, by an input sensor, a signal indicative of a start of a trip by the user.

According to a third aspect, the present disclosure refers to a method of detecting a likelihood of an accident of a user wearing a helmet, comprising: receiving, by a server, an alert signal indicating there is the likelihood of the accident, and sending, by the server, a request message requesting assistance to the user, wherein the server is at least one of travel co-ordination server or a remote assistance server; wherein the method further comprises detecting, by an input sensor, a signal indicative of a start of a trip by the user.

BRIEF DESCRIPTION OF THE DRAWINGS

Some aspects of at least one embodiment of the present invention will now be described with reference to the drawings and appendices, in which.

DETAILED DESCRIPTION INCLUDING BEST MODE

Terms Description

Figure 1:
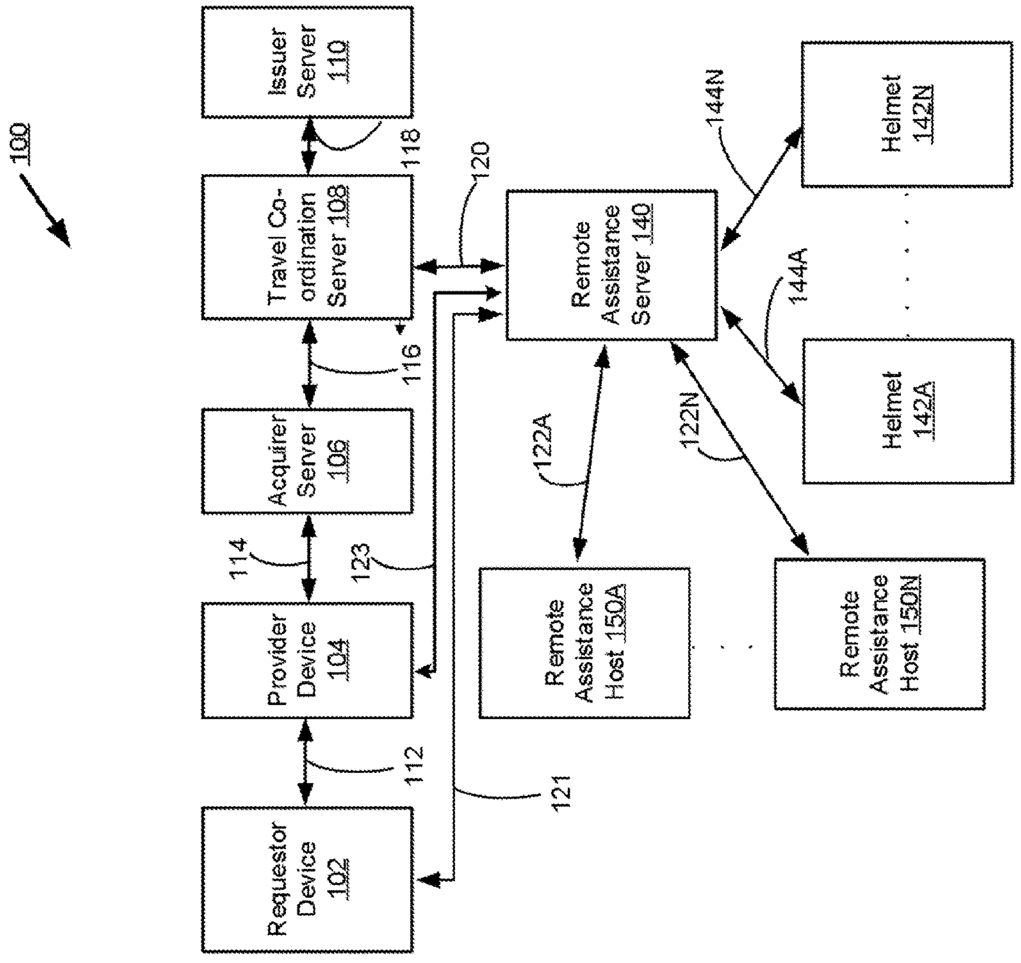
FIG. 1 shows a system to detect a likelihood of accident according to an aspect of the present disclosure.

User-a user may be any suitable type of entity, which may include a person, a motorcycle driver, a race car driver and a go-cart drive. The term user is used herein to identify an entity that uses a helmet to send an alert signal to a server.

A user who is registered to the travel co-ordination server will be called a registered user. A user who is not registered to the travel co-ordination server will be called a non-registered user. The term user will be used to collectively refer to both registered and non-registered users. A user may also be a rider or a pillion rider of a motorcycle.

Travel Co-ordination Server—The travel co-ordination server is a server that hosts software application programs for processing payment transactions or travel co-ordination requests. The travel co-ordination server communicates with any other servers (e.g., a remote assistance server) to travel co-ordination requests. The travel co-ordination server communicates with a remote assistance server to facilitate situations in which there is a likelihood of an accident. Travel co-ordination server servers may use a variety of different protocols and procedures in order to process the payment and travel co-ordination requests.

Transactions that may be performed via a travel co-ordination server include product or service purchases, credit purchases, debit transactions, fund transfers, account withdrawals, etc. Travel co-ordination servers may be configured to process transactions via cash-substitutes, which may include payment cards, letters of credit, checks, payment accounts, etc.

The travel co-ordination server is usually managed by a service provider that may be an entity (e.g. a company or organization) which operates to process requests, pair a provider of the travel co-ordination request to a requestor of the travel co-ordination request. The travel co-ordination server may include one or more computing devices that are used for processing travel co-ordination requests.

A travel co-ordination account-a travel co-ordination account is an account of a user who is registered at a travel co-ordination server. The user can be a customer, a hail provider (e.g., a driver), or any third parties (e.g., a courier) who want to use the travel co-ordination server. In certain circumstances, the travel co-ordination account is not required to use the remote assistance server. A travel co-ordination account includes details (e.g., name, address, vehicle etc.) of a user.

The travel co-ordination server manages the travel co-ordination accounts of users and the interactions between users and other external servers.

Likelihood of an accident—A likelihood of an accident includes situations in which it is determined that an accident has happened or is about to happen. In some examples, that the status is pending and further input is required to determine whether or not the user is in an accident.

Alert signal—An alert signal refers an action (e.g., message or notification) which informs a server (e.g., travel co-ordination) that the user is likely to be involved in an accident. It is to be understood that the alert (which may be a visual alert or an audio alert) may be sent via any type of suitable communication means. The alert signal may be sent out together with a likelihood of an accident event being above a threshold value (e.g. 95%). The likelihood can be estimated based on past data for accident detection.

DETAILED DESCRIPTION

Where reference is made in any one or more of the accompanying drawings to steps and/or features, which have the same reference numerals, those steps and/or features have for the purposes of this description the same function(s) or operation(s), unless the contrary intention appears.

It is to be noted that the discussions contained in the "Background" section and that above relating to prior art arrangements relate to discussions of devices which form public knowledge through their use. Such should not be interpreted as a representation by the present inventor(s) or the patent applicant that such devices in any way form part of the common general knowledge in the art.

The System 100

FIG. 1 illustrates a block diagram of a system 100 for managing an alert signal indicative of a likelihood of an accident. Further, the system 100 enables a travel request and a payment transaction for a ride between a requestor and a provider.

The system 100 comprises a requestor device 102, a provider device 104, an acquirer server 106, a travel co-ordination server 108, an issuer server 110, a remote assistance server 140, remote assistance hosts 150A to 150N, and helmets 142A to 142N.

The requestor device 102 is in communication with a provider device 104 via a connection 112. The connection 112 may be wireless (e.g., via NFC communication, Bluetooth, etc.) or over a network (e.g., the Internet). The requestor device 102 is also in communication with the remote assistance server 140 via a connection 121. The connection 121 may be a network (e.g., the Internet).

The provider device 104 is in communication with the requestor device 102 as described above, usually via the travel co-ordination server 108. The provider device 104 is, in turn, in communication with an acquirer server 106 via a connection 114. The provider device 104 is also in communication with the remote assistance server 140 via a connection 123. The connections 114 and 123 may be a network (e.g., the Internet).

The acquirer server 106, in turn, is in communication with a travel co-ordination server 108 via a connection 116. The travel co-ordination server 108, in turn, is in communication with an issuer server 110 via a connection 118. The connections 116 and 118 may be a network (e.g., the Internet).

The travel co-ordination server 108 is further in communication with the remote assistance server 140 via a connection 120. The connection 120 may be over a network (e.g., a local area network, a wide area network, the Internet, etc.). In one arrangement, the travel co-ordination 108 and the remote assistance server 140 are combined and the connection 120 may be an interconnected bus.

The remote assistance server 140, in turn, is in communication with the remote assistance hosts 150A to 150N via respective connections 122A to 122N. The connections 122A to 122N may be a network (e.g., the Internet).

The remote assistance hosts 150A to 150N are servers. The term host is used herein to differentiate between the remote assistance hosts 150A to 150N and the remote assistance server 140. The remote assistance hosts 150A to 150N are collectively referred to herein as the remote assistance hosts 150, while the remote assistance host 150 refers to one of the remote assistance hosts 150. The remote assistance hosts 150 may be combined with the remote assistance server 140. In an example, the remote assistance host 150 may be one managed by a hospital and the remote assistance server 140 is a central server that manages emergency calls and decides which of the remote assistance hosts 150 to forward an emergency call.

Helmets 142A to 142N are connected to the remote assistance server 140 or the travel co-ordination server 108 via respective connections 144A to 144N. The helmets 142A to 142N are collectively referred to herein as the helmets 142, while the helmet 142 refers to one of the helmets 142. The connections 144A to 144N are collectively referred to herein as the connections 144, while the connection 144 refers to one of the connections 144. The connection 144 may be wireless (e.g., via NFC communication, Bluetooth, etc.) or over a network (e.g., the Internet). The helmet 144 may also send a signal to at least one of the requestor device 102 or the provider device 104 via a wireless connection (e.g., via NFC communication, Bluetooth, etc.) or over a network (e.g., the Internet). The helmet 144 may also be connected to a cloud that facilitates the system 100 for managing an alert signal indicative of a likelihood of an accident. For example, the helmet 144 can send a signal to the cloud directly via a wireless connection (e.g., via NFC communication, Bluetooth, etc.) or over a network (e.g., the Internet). The helmet 144 may also send a signal to the cloud via at least one of the requestor device 102 or the provider device 104.

In the illustrative embodiment, each of the devices 102, 104, 142; and the servers 106, 108, 110, 140, and 150 provides an interface to enable communication with other connected devices 102, 104, 142 and/or servers 106, 108, 110, 140, and 150. Such communication is facilitated by an application programming interface ("API"). Such APIs may be part of a user interface that may include graphical user interfaces (GUIs), Web-based interfaces, programmatic interfaces such as application programming interfaces (APIs) and/or sets of remote procedure calls (RPCs) corresponding to interface elements, messaging interfaces in which the interface elements correspond to messages of a communication protocol, and/or suitable combinations thereof. For example, it is possible for at least one of the requestor device 102 and the provider device 104 to send an alert signal when a user presses a panic button on the GUI running on the respective API. Similarly, it is possible to place a call to an emergency contact as identified by the requestor or the provider when an alert signal is sent.

Use of the term 'server' herein can mean a single computing device or a plurality of interconnected computing devices which operate together to perform a particular function. That is, the server may be contained within a single hardware unit or be distributed among several or many different hardware units.

The Remote Assistance Server 140

The remote assistance server 140 is associated with an entity (e.g. a company or organization or moderator of the service). In one arrangement, the remote assistance server 140 is owned and operated by the entity operating the travel co-ordination server 108. In such an arrangement, the remote assistance server 140 may be implemented as a part (e.g., a computer program module, a computing device, etc.) of the travel co-ordination server 108.

The travel co-ordination server 140 is also configured to manage the registration of users. A registered user has a remote access account (see the discussion above) which includes details of the user. The registration step is called on-boarding. A user may use either the requestor device 102 or the provider device 104 to perform on-boarding to the remote assistance server 140.

It is not necessary to have a remote assistance account at the remote assistance server 140 to access the functionalities of the remote assistance server 140. However, there are functions that are available to a registered user. These additional functions will be discussed below.

The on-boarding process for a user is performed by the user through one of the requestor device 102 or the provider device 104. In one arrangement, the user downloads an app (which includes the API to interact with the remote assistance server 140) to the helmet 142. In another arrangement, the user accesses a website (which includes the API to interact with the remote assistance server 140) on the requestor device 102 or the provider device 104. The user is then able to interact with the remote assistance server 140 via the helmet 142 that is paired with the user. The user may be a requestor or a provider associated with the requestor device 102 or the provider device 104, respectively.

Details of the registration include, for example, name of the user, address of the user, emergency contact, blood type or other healthcare information and the helmet 142 that is authorized to update the remote assistance account, and the like.

Once on-boarded, the user would have a remote assistance account that stores all the details.

The Requestor Device 102

The requestor device 102 is associated with a customer (or requestor) who is a party to a travel request that occurs between the requestor device 102 and the provider device 104. The requestor device 102 may be a computing device such as a desktop computer, an interactive voice response (IVR) system, a smartphone, a laptop computer, a personal digital assistant computer (PDA), a mobile computer, a tablet computer, and the like. The requestor device 102 may also be a payment device such as a credit card.

The requestor device 102 includes transaction credentials (e.g., a payment account) of a requestor to enable the requestor device 102 to be a party to a payment transaction.

If the requestor has a remote assistance account, the remote assistance account may also be included (i.e., stored) in the requestor device 102. For example, a credit card (which is a requestor device 102) may have the remote access account of the customer stored in the credit card. In an alternative arrangement, the remote access account belongs to a user (e.g., a parent or child of the customer) associated with the customer. That is, in the event of a likelihood of an accident, the parent or child of the customer will be informed accordingly.

In one example arrangement, the requestor device 102 is a computing device in a watch or similar wearable and is fitted with a wireless communications interface (e.g., a NFC interface). The requestor device 102 can then electronically communicate with the provider device 104 regarding a travel request. The customer uses the watch or similar wearable to make request regarding the travel request by pressing a button on the watch or wearable.

The Provider Device 104

The provider device 104 is associated with a provider who is also a party to the travel request that occurs between the requestor device 102 and the provider device 104. The provider device 104 may be a computing device such as a desktop computer, an interactive voice response (IVR) system, a smartphone, a laptop computer, a personal digital assistant computer (PDA), a mobile computer, a tablet computer, and the like. The provider device 104 may also be a payment device such as a credit card.

Hereinafter, the term "provider" refers to a service provider and any third party associated with providing a travel or ride or delivery service via the provider device 104. Therefore, the remote assistance account of a provider refers to both the remote assistance account of a provider and the remote assistance account of a third party (e.g., a travel co-ordinator) associated with the provider.

If the provider has a remote assistance account, the remote assistance account may also be included (i.e., stored) in the provider device 104. For example, a credit card (which is a provider device 104) may have the remote access account of the provider stored in the credit card. In an alternative arrangement, the remote access account belongs to a user (e.g., a parent or spouse of the provider) associated with the provider. That is, in the event of a likelihood of an accident, the parent or spouse of the provider will be informed accordingly.

In one example arrangement, the provider device 104 is a computing device in a watch or similar wearable and is fitted with a wireless communications interface (e.g., a NFC interface). The provider device 104 can then electronically communicate with the requestor to make request regarding the travel request by pressing a button on the watch or wearable.

The Acquirer Server 106

The acquirer server 106 is associated with an acquirer who may be an entity (e.g. a company or organization) which issues (e.g. establishes, manages, administers) a payment account (e.g. a financial bank account) of a merchant. Examples of the acquirer include a bank and/or other financial institution. As discussed above, the acquirer server 106 may include one or more computing devices that are used to establish communication with another server (e.g., the travel co-ordination server 108) by exchanging messages with and/or passing information to the other server. The acquirer server 106 forwards the payment transaction relating to a travel request to the travel co-ordination server 108.

The Travel Co-Ordination Server 108

The travel co-ordination server 108 is as described above in the terms description section.

The travel co-ordination server 108 is configured to process processes relating to a remote access account transaction by forwarding the alert signal indicating of a likelihood of an accident.

The Issuer Server 110

The issuer server 110 is associated with an issuer and may include one or more computing devices that are used to perform a payment transaction. The issuer may be an entity (e.g. a company or organization) which issues (e.g. establishes, manages, administers) a transaction credential or a payment account (e.g. a financial bank account) associated with the owner of the requestor device 102. As discussed above, the issuer server 110 may include one or more computing devices that are used to establish communication with another server (e.g., the travel co-ordination server 108) by exchanging messages with and/or passing information to the other server.

The Remote Access Hosts 150

The remote access host 150 is a server associated with an entity (e.g. a company or organization) which manages (e.g. establishes, administers) healthcare resources.

In one arrangement, the entity is a hospital. Therefore, each entity operates a remote access host 150 to manage the resources by that entity. In one arrangement, a remote access host 150 receives an alert signal forwarded by the helmet 140 that a user is likely to have met with an accident. The remote access host 150 may then arrange to send resources to the location identified by the location information included in the alert signal.

In one arrangement, the alert signal can be automatically updated on the remote access account associated with the user. Advantageously, this allows other healthcare workers to know if a user has had met with other traffic accidents.

Helmet 142

The helmet 142 is associated with a user associated with the requestor device 102 or the provider device 104. More details of how the helmet may be utilised will be provided below.

Figure 2A:
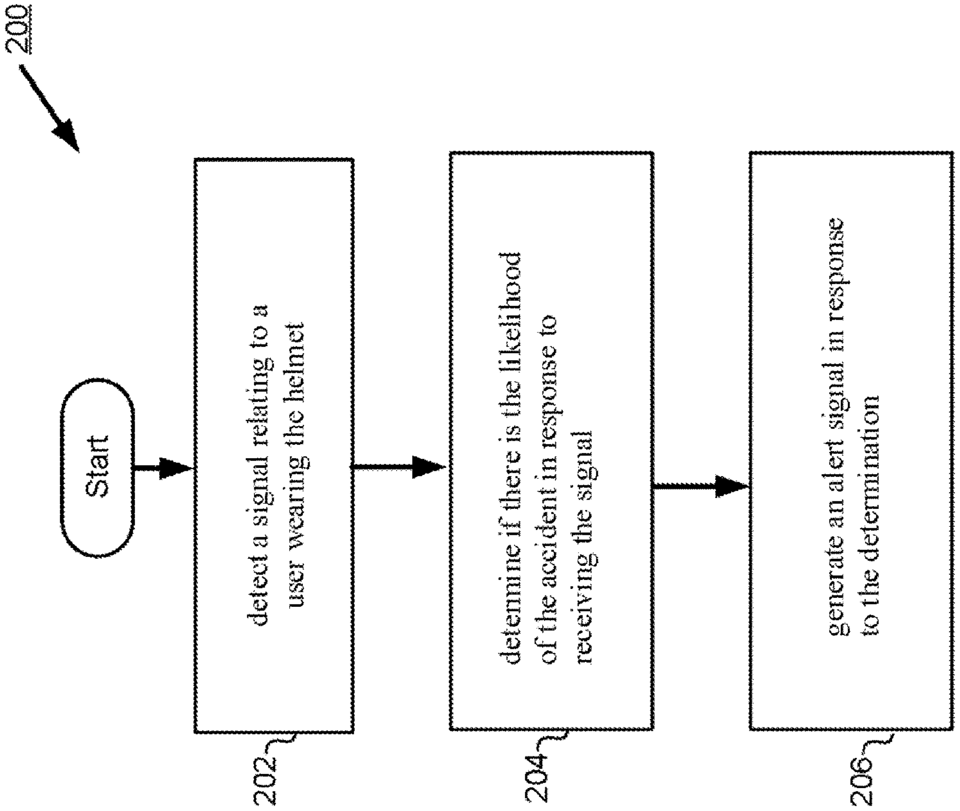
FIGS. 2A and 2B depict a flow diagram of methods of detecting a likelihood of accident using the system of FIG. 1.
Figure 2B:
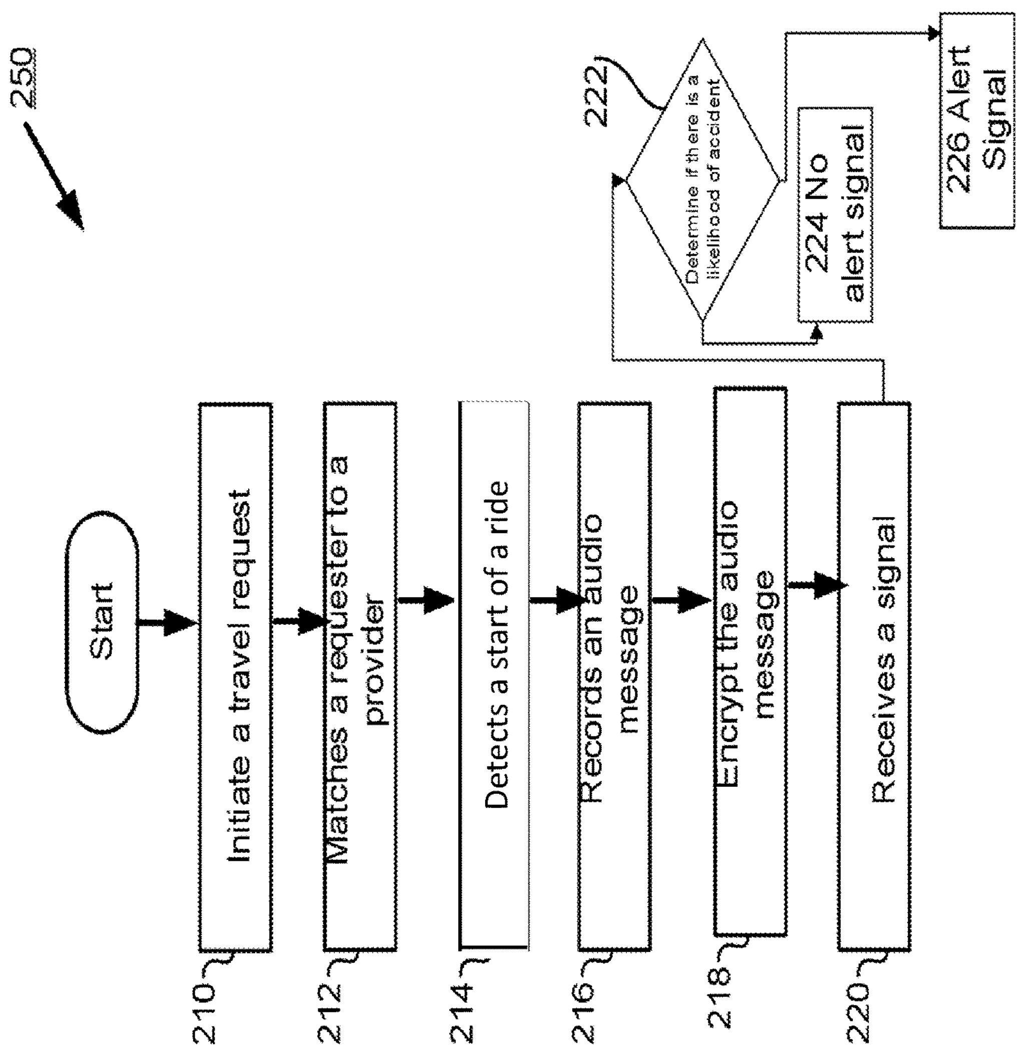

A Method of Detecting a Likelihood of an Accident in Conjunction with an Alert Signal FIGS. 2A and 2B respectively show flow charts of methods 200A and 200B of detecting a likelihood of an accident using the system 100. The methods 200A and 200B are implemented by software application programs that are executable by the devices 102, 104, 142, and the servers 106, 108, 110, 140, 150 in the system 100. The steps performed by the travel co-ordination server 108 in the methods 200A and 200B can be implemented by the software application programs 1333 executable within the computer system 1300 of the travel co-ordination server 108 (see FIG. 6A). In an alternative arrangement of a combined travel co-ordination server 108 and remote access server 140 (as shown in FIG. 6D), the steps performed by the travel co-ordination server 108 in the methods 200A and 200B can be implemented by the software application programs 1533 executable within the computer system 1500.

The method 200A commences at step 202 (see FIG. 2A) by detecting a signal relating to a user wearing a helmet. At step 204, it is determined if there is a likelihood of the accident in response to receiving the signal and at step 206, an alert signal is generated in response to the determination. The alert signal indicates that there is the likelihood of accident.

The method 200B commences at step 210 (see FIG. 2B) by receiving a travel request associated with a remote assistance account. In the travel request, at least a user identifier identifying a user or requestor initiating the travel request and the destination that the requestor would like to go are provided.

The method 200B then proceeds from step 210 to step 212.

In step 212, a response to the travel request message is acquired. The travel co-ordination server may assist to match a requestor to a provider in accordance with protocols that are appreciated by people skilled in the art. The method 200B then proceeds from step 212 to step 214.

In step 214, the method 200B detects a start of the ride. This may be done via an input sensor which is configured to detect a signal indicative of a start of a trip by the user. The input sensor may include a gyroscope sensor that is configured to detect angular velocity of the user. In an example, a change in the angular velocity may suggest a start of a trip. In this step, a proximity sensor may be configured to detect if the helmet is worn properly. The method 200B then proceeds from step 214 to step 216.

In step 216, the method 200B includes recording, via a recorder, an audio message. The recorder may be located on the helmet and is configured to record audio messages relating to the surroundings around the user and conversations for which the user holds during the trip. In an arrangement, the step comprises cancelling noise that is included in the recorded audio message before it is transmitted wirelessly. Advantageously, the recording of audio messages facilitates prevention of incidents such as harassment and can be used as evidence when required, The method 200B then proceeds from step 216 to step 218.

In step 218, the recorded audio message is encrypted before it is transmitted wirelessly. This may be on a predetermined periodic manner. In an example, segments of the encrypted message may be sent every 5 minutes. The method 200B then proceeds from step 218 to step 220.

In step 220, a signal including information at a point in time relating to the user is received. The signal is received in a real-time manner. This signal may be received from at least one of a navigation sensor and a gyroscope sensor. The navigation sensor is one that is configured to detect location information and time information of the user. The gyroscope sensor is one that is configured to detect location orientation and angular velocity of the user. In an arrangement, the signal may be one that is sent via a helmet 142, a requestor device 102 or a provider device 104. For example, the signal may be sent when a user presses a button located on the helmet. The method 200B then proceeds from step 220 to step 222.

In step 222, it is determined if there is a likelihood of accident based on the signal received in step 220. The method 200B then proceeds from step 222 to the method 300.

Figure 3:
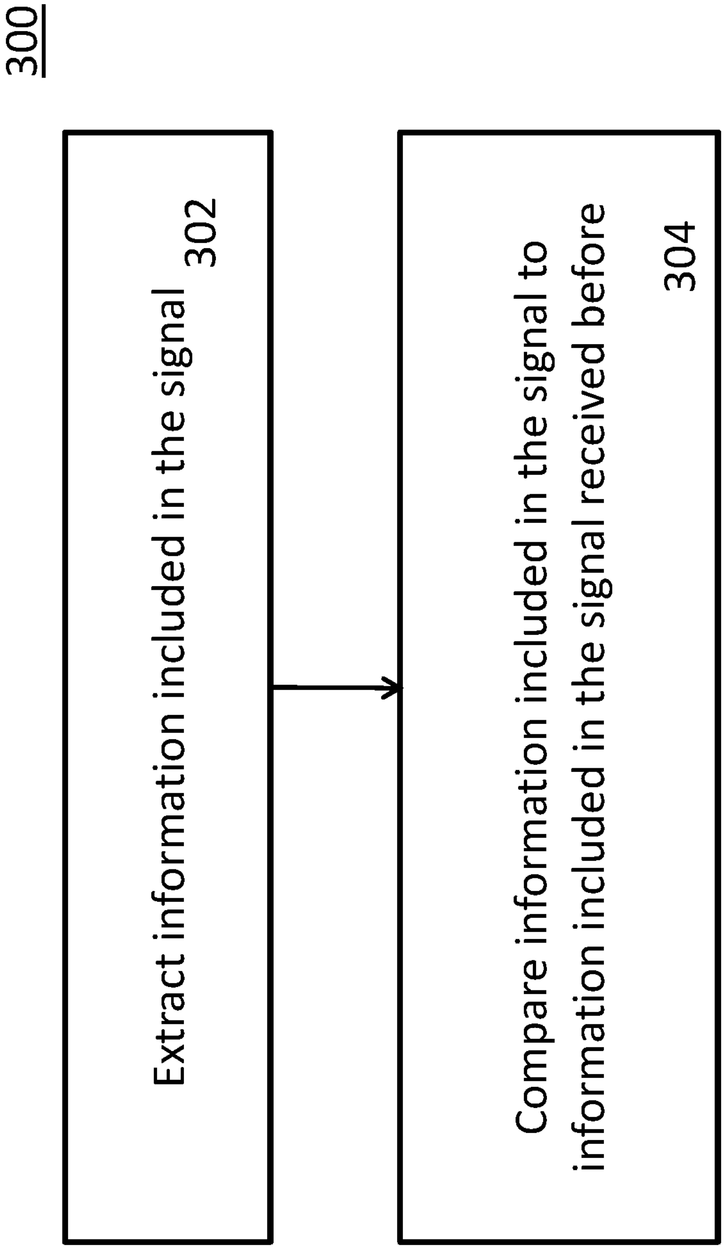
FIG. 3 is a flow diagram of a method of determining whether to generate an alert signal.

The method 300 is shown in FIG. 3. The method 300 is a method of determining if an alert signal is to be generated. The method 300 will be discussed in detail below.

As will be described hereinafter, the method 300 returns whether or not to generate an alert signal. In the event that it is determined that an alert signal is not to be generated, the method 200B then proceeds from step 222 to step 224.

In the event that it is determined that an alert signal is not to be generated, the method 200B then proceeds from step 222 to step 226. In step 226, the alert signal is generated and a pre-determined emergency procedure may be initiated. In an arrangement, the alert signal may be sent to at least one of the travel co-ordination server 108 or the remote assistance server 140. Alternatively, or additionally, a person who is identified as an emergency contact of the user during on-boarding may be contacted.

The method 200B proceeds from step 224 or step 226 to a method 400. The method 400 is a method of updating the details relating to the trip during which the likelihood of accident is determined.

The method 400 will be described below in relation to FIG. 4. The method 200B concludes at the conclusion of the method 400.

The Method 300 for Determining Whether or not to Generate an Alert Signal

FIG. 3 shows a flow chart of the method 300 for determining whether or not to generate an alert signal. The steps in the method 300 can be implemented by the software application programs 1433 executable within the computer system 1400 of the remote assistance server 140 (see FIG. 6C). In an alternative arrangement of a combined travel co-ordination server 108 and remote assistance server 140 (as shown in FIG. 6D), the steps in the method 300 can be implemented by the software application programs 1533 executable within the computer system 1500.

The method 300 commences at step 302 where the remote assistance server 140 or the travel co-ordination server 180 receives the signal that may be sent on a pre-determined time. The signal includes at least an identity of the user, time information, location information, angular velocity and the like when the signal is sent. In step 302, such information is extracted.

The method 300 then proceeds from step 302 to step 304.

In step 304, the information that is extracted in step 302 is compared with that extracted from a signal received at an earlier pre-determined time. The difference between the information is then sent as a response. In one arrangement, the difference may be a difference in angular velocity of the user at two different points in time. In another arrangement, the difference indicates if the user is staying on track while travelling to the destination indicated in the travel request. The result of the comparison step in 314 is returned as a response to method 200B.

It is also to be appreciated that it is possible for a user to send a request to send an alert signal by pressing a panic button that is located on the helmet. In one arrangement, the panic button may be displayed as an option on the requestor device 102 or the provider device 104.

The Method 400 for Updating Details Relating to the Trip

Figure 4:
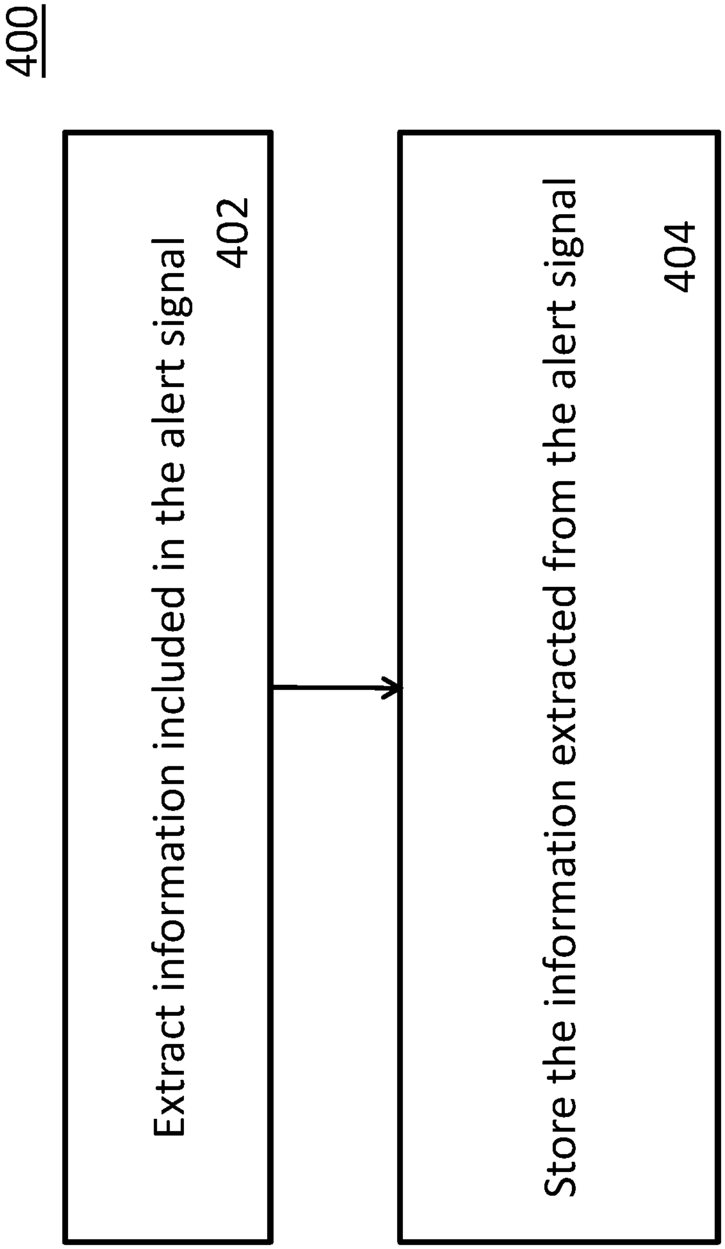
FIG. 4 is a flow diagram of a method of updating the details relating to the trip during which the likelihood of accident is determined.

FIG. 4 shows a flow chart of the method 400 for updating the details of a remote access account based on the details relating to the trip. The steps in the method 400 can be implemented by the software application programs 1433 executable within the computer system 1400 of the remote access server 140 (see FIG. 6C). In an alternative arrangement of a combined travel co-ordination server 108 and remote access server 140 (as shown in FIG. 6D), the steps in the method 400 can be implemented by the software application programs 1533 executable within the computer system 1500.

The method 400 commences at step 402 where the remote access server 140 receives an alert signal indicating that there is likelihood of an accident. The request to do so can be received from the travel co-ordination server 108 in the methods 200A and 200B. Such a request can also be received from the provider device 104, via connection 123, at the completion of step 226. The request can also be received from the current user at any time from any of the helmets 142A to 142N. As described in relation to step 231, the request may be included in the alert signal as described above.

Each of the alert signals includes information relating to the user and the accident. For example, name of the user, and time and location of the accident. In an arrangement, a response to the alert signal may also be sent in step 402. The response to the alert signal may include the type of the healthcare resource that is rendered to the user.

The method 400 then proceeds from step 402 to step 404.

The information, relating to the alert signal, which are extracted in step 402 is saved. Advantageously, this may help to increase accuracy of the method 300 in determining whether to generate an alert signal. The information that is extracted in step 402 may function as data for comparison that is carried out in step 304.

Figure 5A:
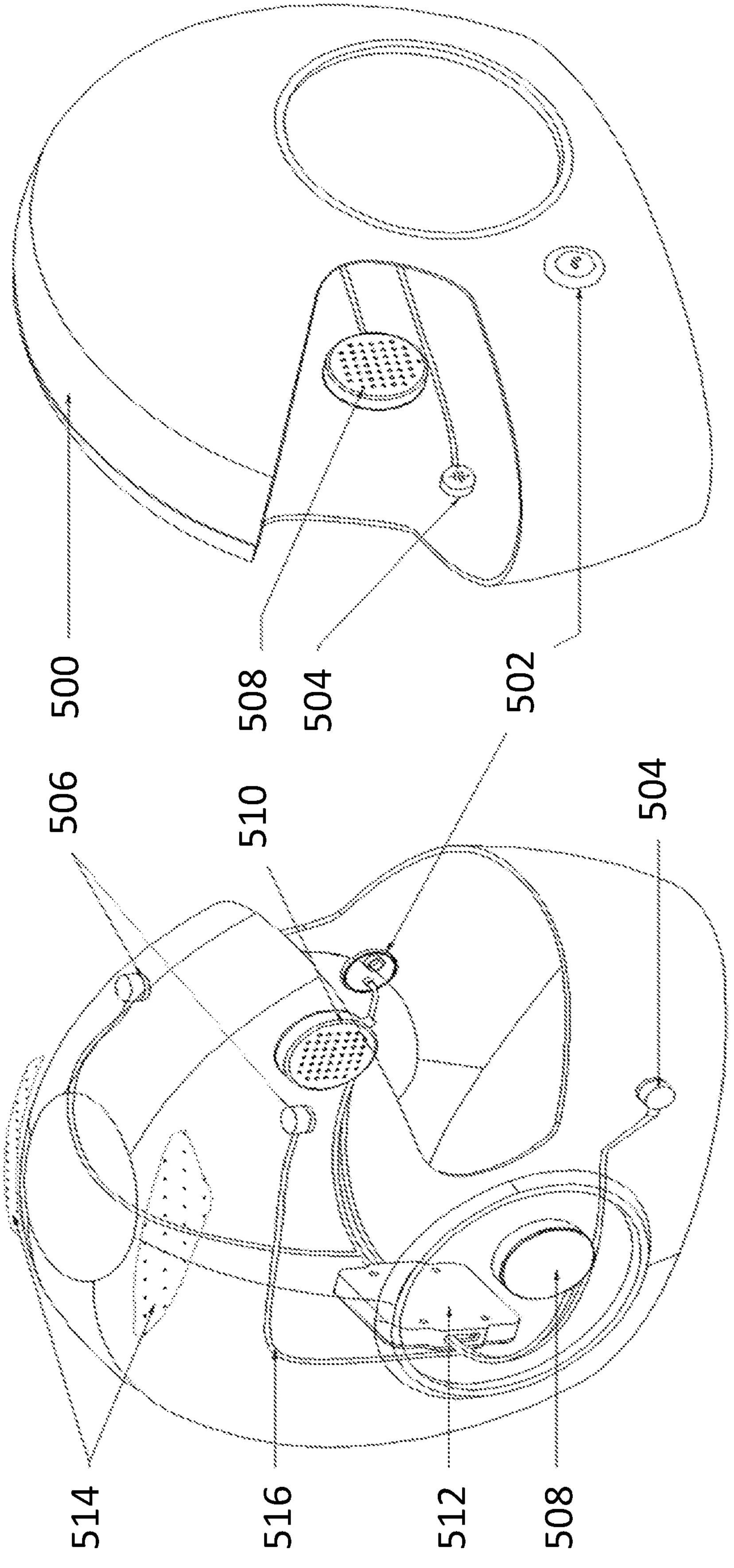
FIG. 5A is a diagram of a helmet in perspective view and FIG. 5B is a block diagram of components in a helmet.

FIG. 5A is a diagram of a helmet 500 from two perspective views. The helmet 500 may comprise a button 502 which may be pressed for answering calls. Alternatively, the button 502 may function as a panic button that can be pressed to indicate an emergency. A microphone 504 installed in the helmet 500 may be used detecting audio messages. One or more active noise reduction microphones 506 may be installed within the helmet to cancel noise for clearer detection of audio messages by the microphone 504. The helmet may also comprise a right speaker 508 and left speaker 510 to provide audio output from incoming calls. One or more LED lightbelts 514 may be installed on the helmet 500 to provide illumination and alert lights for enhancing safety when travelling. A PCBA (Printed Circuit Board Assembly)-box 512 may be installed within the back of the helmet 500 to serve as a control unit and supply power for the other components. Accordingly, the button 502, microphone 504, active noise reduction microphones 506, right speaker 508, left speaker 510 and LED lightbelts 514 may be connected via wire lines 516 to the PCBA-box 512.

Although not shown, the helmet 500 may also comprise a gyroscope sensor for detecting angular velocity of the helmet, a panic button, a navigation sensor to detect location information and time information, one or more proximity sensors and other similar components that facilitate detection of likelihood of an accident. These components may also be connected to the PCBA-box 512 via wire lines 516. The proximity sensors may be similar to sensors used on a smartphone to detect if the phone is picked up or placed closed to a face, and thus installed in the helmet 500 to detect whether the helmet 500 is being worn properly or not. The helmet 500 may also comprise a strip (not shown) for securing the helmet on a user's head. Additionally or alternatively, the strip may include a lock switch that can be used to determine if the helmet 500 is worn properly. For example, when a user wears the helmet 500, the strip may be latched such that the lock switch is triggered to indicate that the helmet 500 is worn. In situations where the strip is latched but no one is wearing the helmet 500, the proximity sensors may detect and then give an alert that the helmet is not worn properly. It will be appreciated that the locations of the various components on the helmet 500 may be changed according to design requirements. Advantageously, the helmet 500 facilitates hands-free communication to enhance safety during trips.

Figure 5B:
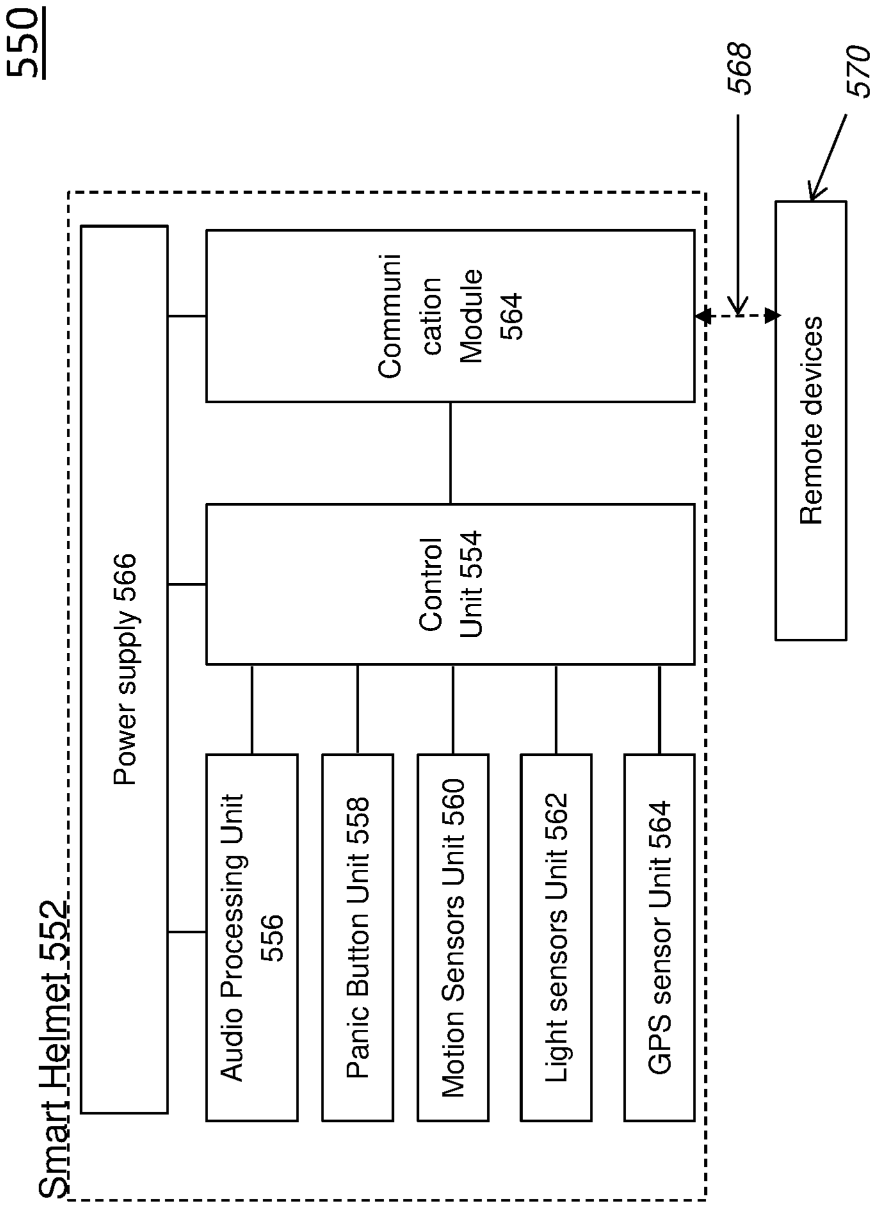

FIG. 5B is a block diagram 550 of helmet 552 and its components as illustrated in FIG. 5A. Referring to FIG. 1, the helmet 142 may be represented by the block diagram 550 of helmet 552. The helmet 552 includes a control unit 554 that provides functions for processing information and instructions to and from the various components and modules of the helmet 552. The various components include an audio processing unit 556, a panic button unit 558, a motion sensors unit 560, a P/L sensors unit 562 and a GPS sensor unit 564. The helmet 552 also includes a power supply module 566 that supplies power to all the various units and modules, and may comprise a rechargeable or non-rechargeable battery wherein power is supplied to the various units through wired or wireless means. The helmet further includes a communication module 564 that is utilized by the control unit 554 for receiving and transmitting information via connection 568 to remote devices 570 such as the requestor device 102, the provider device 104, cloud, or servers such as the remote assistance server 140 or the travel co-ordination server 108. The connection 568, similar to connection 144, may be wireless (e.g., via NFC communication, Bluetooth, etc.) or over a network (e.g., the Internet).

The audio processing unit 556 is in wired or wireless communication with the control unit 554 as well as audio sensors such as the microphones and speakers of the helmet. It provides functions for controlling the audio sensors, for example turning on or off these components based on instructions provided by the control unit 554. It may also provide functions for processing audio information that is detected by these sensors. For example, referring to steps 216 and 218 of method 200*b* as discussed in FIG. 2B, the audio processing unit 556 may serve as a recorder to record and/or continue recording an audio message that is detected by the microphone/s and speakers, and may also encrypt the recorded audio message for sending to the control unit 554. Alternatively, the audio processing unit 556 may forward the audio message detected by the microphone/s and speakers to the control unit 554, such that the control unit 554 serves as the recorder instead to record or continue recording said audio message, and encrypt the recorded audio message. The audio processing unit 556 may also serve as a noise cancelling module to cancel noise that is included in the recorded audio message or, in the case where the control unit 554 is doing the recording, perform the noise cancelling on the audio message before transmitting to the control unit 554. Alternatively, the noise cancelling can be done at the control unit 554.

The panic button unit 558 is in wired or wireless communication with the control unit 554 as well as the panic button on the helmet, and provides functions for relaying a signal to the control unit 554 when the panic button is pressed. Referring to step 220 of method 200*b*, the signal is then sent by the control unit 554 via the communication module 564 to remote devices 570 such as the requestor device 102, provider device 104 or remote assistance server 140. The signal includes information at a point in time relating to the user that is detected by the navigation sensor and gyroscopic sensor, and is received in a real-time manner.

The motion sensors unit 560 is in wired or wireless communication with the control unit 554 as well as the accelerometer and gyroscope sensor on the helmet, and provides functions for controlling the sensors (for example turning on or off the sensors based on instructions provided by the control unit 554) as well as relaying or processing information or signals detected by the sensors to the control unit 554. For example, the gyroscope sensor is configured to detect location orientation and angular velocity of the user. The motion sensors unit 560 processes the information detected by the gyroscope sensors and determines if there is a likelihood of an accident based on the detected information. If it is determined that there is such a likelihood, the motion sensors unit 560 transmits the information to the control unit 554. Referring to step 220 of method 200*b*, the control unit 554 sends an alert signal via the communication module 564 to remote devices 570 such as the requestor device 102, provider device 104 or remote assistance server 140. The signal includes information at a point in time relating to the user that is detected by the navigation sensor and gyroscopic sensor, and is received in a real-time manner.

The P/L sensors unit 562 is in wired or wireless communication with the control unit 554 as well as the proximity sensors on the helmet, and provides functions for controlling the sensors (for example turning on or off the sensors based on instructions provided by the control unit 554) as well as relaying or processing information or signals detected by the sensors to the control unit 554. For example, the proximity sensor is configured to detect if the helmet is worn properly, and provides the information for the proximity sensors unit 562. The information may be relayed to the control unit 554, which transmits said information via the communication module 564 to the remote devices 570 such as the requestor device 102, provider device 104 or remote assistance server 140. Referring to step 220 of method 200*b*, the information detected by the proximity sensor may be also transmitted together with the alert signal of a likelihood of an accident.

The GPS sensor unit 564 is in wired or wireless communication with the control unit 554 as well as the navigation sensor on the helmet, and provides functions for controlling the sensor (for example turning on or off the sensor based on instructions provided by the control unit 554) as well as relaying or processing information or signals detected by the sensors to the control unit 554. For example, the navigation sensor is configured to detect location information and time information of the user, and provides the information for the proximity sensors unit 562. The information is relayed to the control unit 554, which transmits said information via the communication module 564 to the remote devices 570 such as the requestor device 102, provider device 104 or remote assistance server 140. Referring to step 220 of method 200*b*, the information detected by the navigation sensor is also transmitted together with the alert signal of a likelihood of an accident.

Structural Context

The Travel Co-Ordination Server 108

Figure 6A:
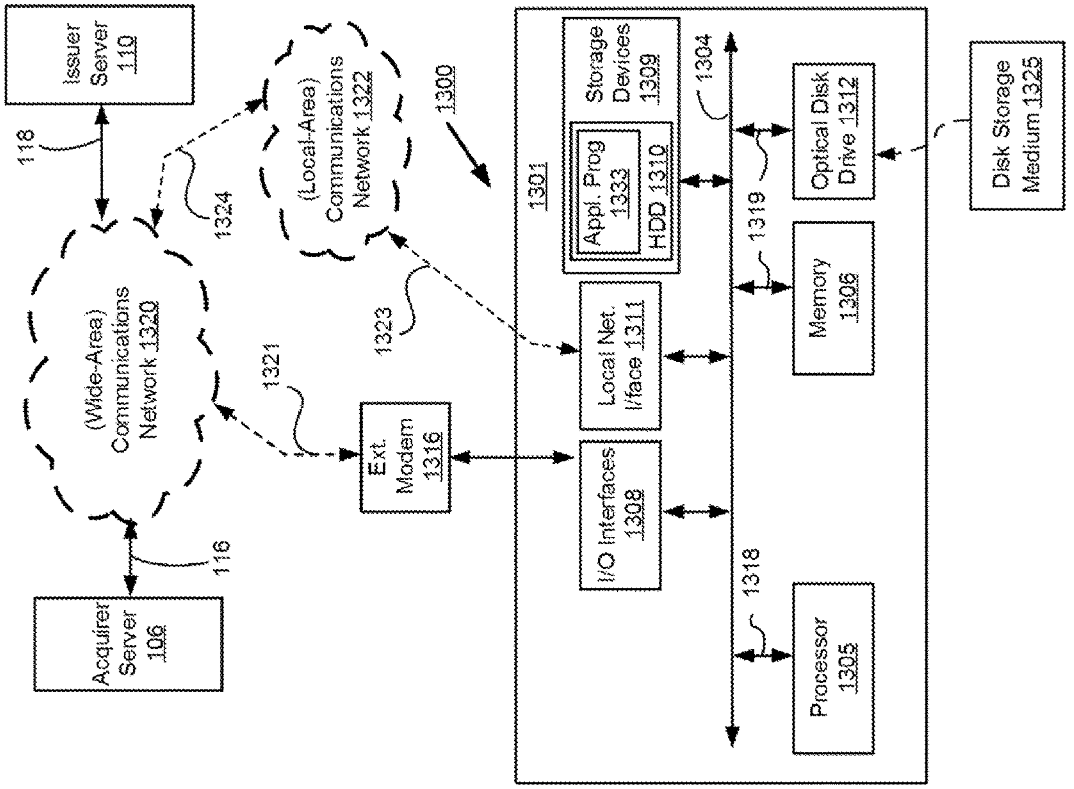
FIGS. 6A and 6B form a schematic block diagram of a general purpose computer system upon which the travel co-ordination server of FIG. 1 can be practiced.
Figure 6B:
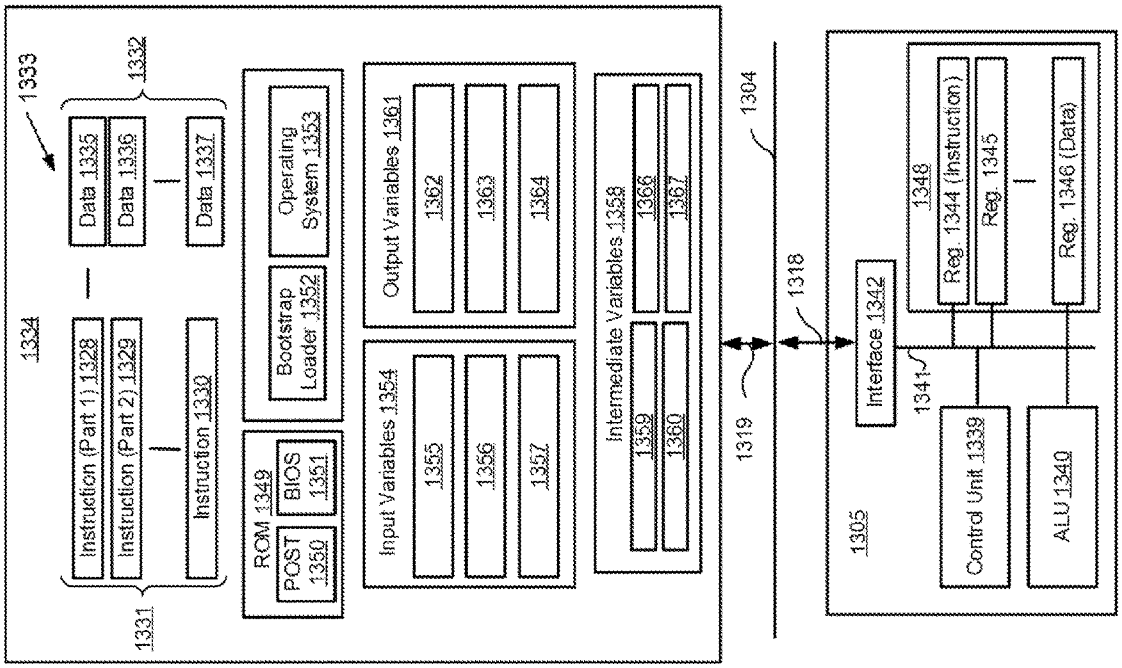

FIGS. 6A and 6B depict a general-purpose computer system 1300, upon which the travel co-ordination server 108 described can be practiced.

As seen in FIG. 6A, the computer system 1300 includes a computer module 1301. An external Modulator-Demodulator (Modem) transceiver device 1316 may be used by the computer module 1301 for communicating to and from a communications network 1320 via a connection 1321. The communications network 1320 may be a wide-area network (WAN), such as the Internet, a cellular telecommunications network, or a private WAN. Where the connection 1321 is a telephone line, the modem 1316 may be a traditional "dial-up" modem. Alternatively, where the connection 1321 is a high capacity (e.g., cable) connection, the modem 1316 may be a broadband modem. A wireless modem may also be used for wireless connection to the communications network 1320.

The computer module 1301 typically includes at least one processor unit 1305, and a memory unit 1306. For example, the memory unit 1306 may have semiconductor random access memory (RAM) and semiconductor read only memory (ROM). The computer module 1301 also includes an interface 1308 for the external modem 1316. In some implementations, the modem 1316 may be incorporated within the computer module 1301, for example within the interface 1308. The computer module 1301 also has a local network interface 1311, which permits coupling of the computer system 1300 via a connection 1323 to a local-area communications network 1322, known as a Local Area Network (LAN). As illustrated in FIG. 6A, the local communications network 1322 may also couple to the wide network 1320 via a connection 1324, which would typically include a so-called "firewall" device or device of similar functionality. The local network interface 1311 may comprise an Ethernet circuit card, a Bluetooth® wireless arrangement or an IEEE 802.11 wireless arrangement; however, numerous other types of interfaces may be practiced for the interface 1311.

The I/O interfaces 1308 may afford either or both of serial and parallel connectivity, the former typically being implemented according to the Universal Serial Bus (USB) standards and having corresponding USB connectors (not illustrated). Storage devices 1309 are provided and typically include a hard disk drive (HDD) 1310. Other storage devices such as a floppy disk drive and a magnetic tape drive (not illustrated) may also be used. An optical disk drive 1312 is typically provided to act as a non-volatile source of data. Portable memory devices, such optical disks, USB-RAM, portable, external hard drives, and floppy disks, for example, may be used as appropriate sources of data to the system 1300.

The components 1305 to 1312 of the computer module 1301 typically communicate via an interconnected bus 1304 and in a manner that results in a conventional mode of operation of the computer system 1300 known to those in the relevant art. For example, the processor 1305 is coupled to the system bus 1304 using a connection 1318. Likewise, the memory 1306 and optical disk drive 1312 are coupled to the system bus 1304 by connections 1319. Examples of computers on which the described arrangements can be practised include IBM-PC's and compatibles, Sun Sparcstations, Apple or like computer systems.

The steps of the methods 200A and 200B in FIGS. 2A and 2B, respectively, performed by the travel co-ordination server 108 may be implemented using the computer system 1300. The steps of the method 200 and method 300 may be implemented as one or more software application programs 1333 executable within the computer system 1300. In particular, the steps of the method 200 and method 300 as performed by the travel co-ordination server 108 are effected by instructions 1331 (see FIG. 6B) in the software 1333 that are carried out within the computer system 1300. The software instructions 1331 may be formed as one or more code modules, each for performing one or more particular tasks. The software may also be divided into two separate parts, in which a first part and the corresponding code modules performs the steps of the travel co-ordination server 108 and a second part and the corresponding code modules manage a user interface between the first part and the user.

The software may be stored in a computer readable medium, including the storage devices described below, for example. The software is loaded into the computer system 1300 from the computer readable medium, and then executed by the computer system 1300. A computer readable medium having such software or computer program recorded on the computer readable medium is a computer program product. The use of the computer program product in the computer system 1300 preferably effects an advantageous apparatus for a travel co-ordination server 108.

The software 1333 is typically stored in the HDD 1310 or the memory 1306. The software is loaded into the computer system 1300 from a computer readable medium, and executed by the computer system 1300. Thus, for example, the software 1333 may be stored on an optically readable disk storage medium (e.g., CD-ROM) 1325 that is read by the optical disk drive 1312. A computer readable medium having such software or computer program recorded on it is a computer program product. The use of the computer program product in the computer system 1300 preferably effects an apparatus for a travel co-ordination server 108.

In some instances, the application programs 1333 may be supplied to the user encoded on one or more CD-ROMs 1325 and read via the corresponding drive 1312, or alternatively may be read by the user from the networks 1320 or 1322. Still further, the software can also be loaded into the computer system 1300 from other computer readable media. Computer readable storage media refers to any non-transitory tangible storage medium that provides recorded instructions and/or data to the computer system 1300 for execution and/or processing. Examples of such storage media include floppy disks, magnetic tape, optical disk, a hard disk drive, a ROM or integrated circuit, USB memory, a magneto-optical disk, or a computer readable card such as a PCMCIA card and the like, whether or not such devices are internal or external of the computer module 1301. Examples of transitory or non-tangible computer readable transmission media that may also participate in the provision of software, application programs, instructions and/or data to the computer module 1301 include radio or infra-red transmission channels as well as a network connection to another computer or networked device, and the Internet or Intranets including e-mail transmissions and information recorded on Websites and the like.

The second part of the application programs 1333 and the corresponding code modules mentioned above may be executed to implement one or more graphical user interfaces (GUIs) to be rendered or otherwise represented upon a display. Through manipulation of typically a keyboard and a mouse, a user of the computer system 1300 and the application may manipulate the interface in a functionally adaptable manner to provide controlling commands and/or input to the applications associated with the GUI(s). Other forms of functionally adaptable user interfaces may also be implemented, such as an audio interface utilizing speech prompts output via loudspeakers and user voice commands input via a microphone.

FIG. 6B is a detailed schematic block diagram of the processor 1305 and a "memory" 1334. The memory 1334 represents a logical aggregation of all the memory modules (including the HDD 1309 and semiconductor memory 1306) that can be accessed by the computer module 1301 in FIG. 6A.

When the computer module 1301 is initially powered up, a power-on self-test (POST) program 1350 executes. The POST program 1350 is typically stored in a ROM 1349 of the semiconductor memory 1306 of FIG. 13A. A hardware device such as the ROM 1349 storing software is sometimes referred to as firmware. The POST program 1350 examines hardware within the computer module 1301 to ensure proper functioning and typically checks the processor 1305, the memory 1334 (1309, 1306), and a basic input-output systems software (BIOS) module 1351, also typically stored in the ROM 1349, for correct operation. Once the POST program 1350 has run successfully, the BIOS 1351 activates the hard disk drive 1310 of FIG. 6A. Activation of the hard disk drive 1310 causes a bootstrap loader program 1352 that is resident on the hard disk drive 1310 to execute via the processor 1305. This loads an operating system 1353 into the RAM memory 1306, upon which the operating system 1353 commences operation. The operating system 1353 is a system level application, executable by the processor 1305, to fulfil various high level functions, including processor management, memory management, device management, storage management, software application interface, and generic user interface.

The operating system 1353 manages the memory 1334 (1309, 1306) to ensure that each process or application running on the computer module 1301 has sufficient memory in which to execute without colliding with memory allocated to another process. Furthermore, the different types of memory available in the system 1300 of FIG. 6A must be used properly so that each process can run effectively. Accordingly, the aggregated memory 1334 is not intended to illustrate how particular segments of memory are allocated (unless otherwise stated), but rather to provide a general view of the memory accessible by the computer system 1300 and how such is used.

As shown in FIG. 6B, the processor 1305 includes a number of functional modules including a control unit 1339, an arithmetic logic unit (ALU) 1340, and a local or internal memory 1348, sometimes called a cache memory. The cache memory 1348 typically includes a number of storage registers 1344-1346 in a register section. One or more internal busses 1341 functionally interconnect these functional modules. The processor 1305 typically also has one or more interfaces 1342 for communicating with external devices via the system bus 1304, using a connection 1318. The memory 1334 is coupled to the bus 1304 using a connection 1319.

The application program 1333 includes a sequence of instructions 1331 that may include conditional branch and loop instructions. The program 1333 may also include data 1332 which is used in execution of the program 1333. The instructions 1331 and the data 1332 are stored in memory locations 1328, 1329, 1330 and 1335, 1336, 1337, respectively. Depending upon the relative size of the instructions 1331 and the memory locations 1328-1330, a particular instruction may be stored in a single memory location as depicted by the instruction shown in the memory location 1330. Alternately, an instruction may be segmented into a number of parts each of which is stored in a separate memory location, as depicted by the instruction segments shown in the memory locations 1328 and 1329.

In general, the processor 1305 is given a set of instructions which are executed therein. The processor 1305 waits for a subsequent input, to which the processor 1305 reacts to by executing another set of instructions. Each input may be provided from one or more of a number of sources, including data generated by one or more of the input devices 1302, 1303, data received from an external source across one of the networks 1320, 1302, data retrieved from one of the storage devices 1306, 1309 or data retrieved from a storage medium 1325 inserted into the corresponding reader 1312, all depicted in FIG. 6A. The execution of a set of the instructions may in some cases result in output of data. Execution may also involve storing data or variables to the memory 1334.

The disclosed travel co-ordination server 108 arrangements use input variables 1354, which are stored in the memory 1334 in corresponding memory locations 1355, 1356, 1357. The travel co-ordination server 108 arrangements produce output variables 1361, which are stored in the memory 1334 in corresponding memory locations 1362, 1363, 1364. Intermediate variables 1358 may be stored in memory locations 1359, 1360, 1366 and 1367.

Referring to the processor 1305 of FIG. 6B, the registers 1344, 1345, 1346, the arithmetic logic unit (ALU) 1340, and the control unit 1339 work together to perform sequences of micro-operations needed to perform "fetch, decode, and execute" cycles for every instruction in the instruction set making up the program 1333. Each fetch, decode, and execute cycle comprises:

- a fetch operation, which fetches or reads an instruction 1331 from a memory location 1328, 1329, 1330;
- a decode operation in which the control unit 1339 determines which instruction has been fetched; and
- an execute operation in which the control unit 1339 and/or the ALU 1340 execute the instruction.

Thereafter, a further fetch, decode, and execute cycle for the next instruction may be executed. Similarly, a store cycle may be performed by which the control unit 1339 stores or writes a value to a memory location 1332.

Each step or sub-process in the processes of FIGS. 2A and 2B, as performed by the travel co-ordination server 108, is associated with one or more segments of the program 1333 and is performed by the register section 1344, 1345, 1347, the ALU 1340, and the control unit 1339 in the processor 1305 working together to perform the fetch, decode, and execute cycles for every instruction in the instruction set for the noted segments of the program 1333.

It is to be understood that the structural context of the computer system 1300 (i.e., the travel co-ordination server 108) is presented merely by way of example. Therefore, in some arrangements, one or more features of the server 1300 may be omitted. Also, in some arrangements, one or more features of the server 1300 may be combined together. Additionally, in some arrangements, one or more features of the server 1300 may be split into one or more component parts.

Figure 7:
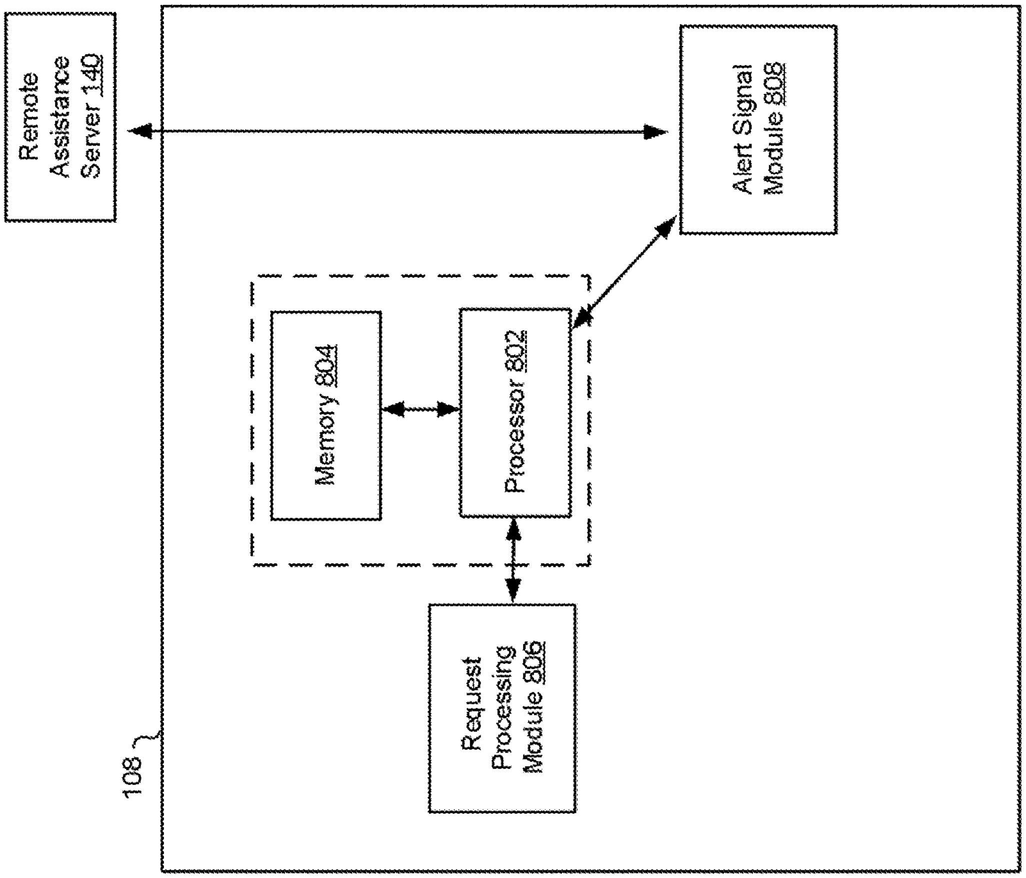
FIG. 7 shows an example of a computing device to realize the travel co-ordination server shown in FIG. 1.

FIG. 7 shows an alternative implementation of the travel co-ordination server 108 (i.e., the computer system 1300). In the alternative implementation, the travel co-ordination server 108 may be generally described as a physical device comprising at least one processor 802 and at least one memory 804 including computer program codes. The at least one memory 804 and the computer program codes are configured to, with the at least one processor 802, cause the travel co-ordination server 108 to perform the operations described in the method 200 and method 300. The travel co-ordination server 108 may also include a transaction request processing module 806 and a alert signal module 808. The memory 804 stores computer program code that the processor 802 compiles to have each of the modules 806 and 808 performs their respective functions.

With reference to FIGS. 1, 2A, and 2B, the travel request processing module 806 performs the function of communicating with the requestor device 102 and the provider device 104; and the acquirer server 106 and the issuer server 110 to respectively receive and transmit a travel request message.

With reference to FIGS. 1, 2A, and 2B, the alert signal module 808 performs the function of communicating with the remote assistance server 140 to carry out processes of a pre-configured emergency protocol.

The Remote Assistance Server 140

Figure 6C:
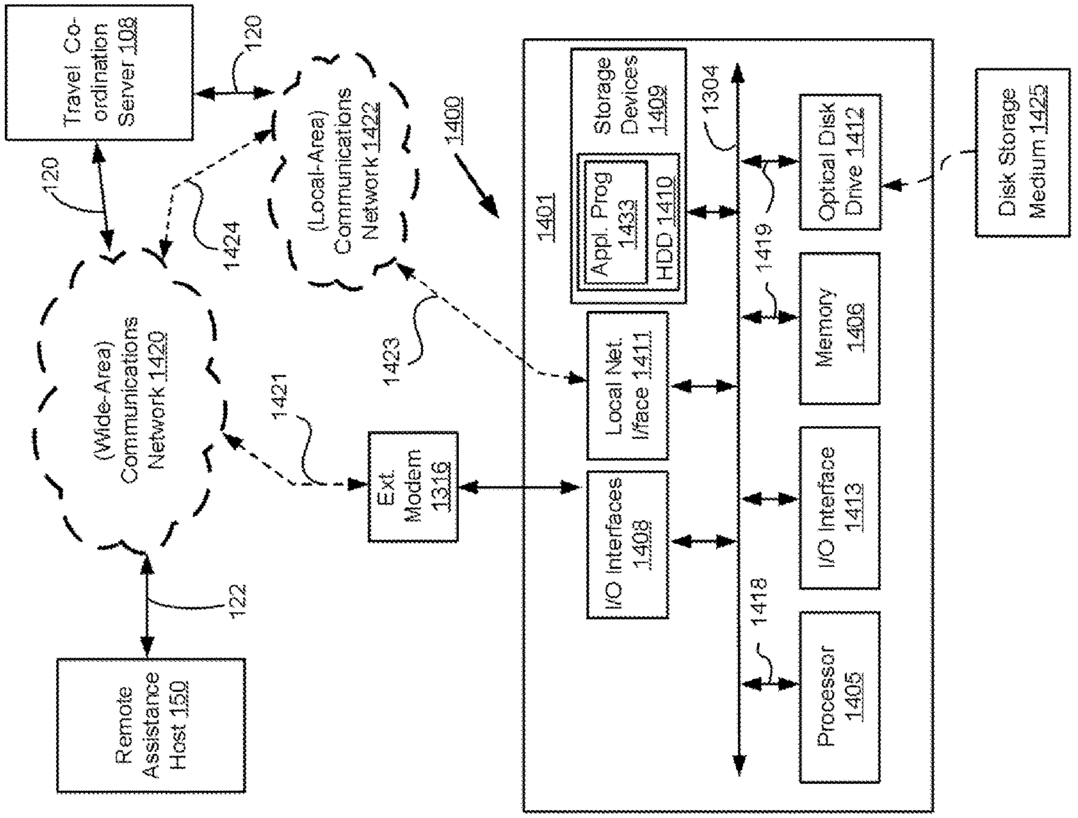
FIG. 6C is a schematic block diagram of a general purpose computer system upon which the remote assistance server of FIG. 1 can be practiced.
Figure 6D:
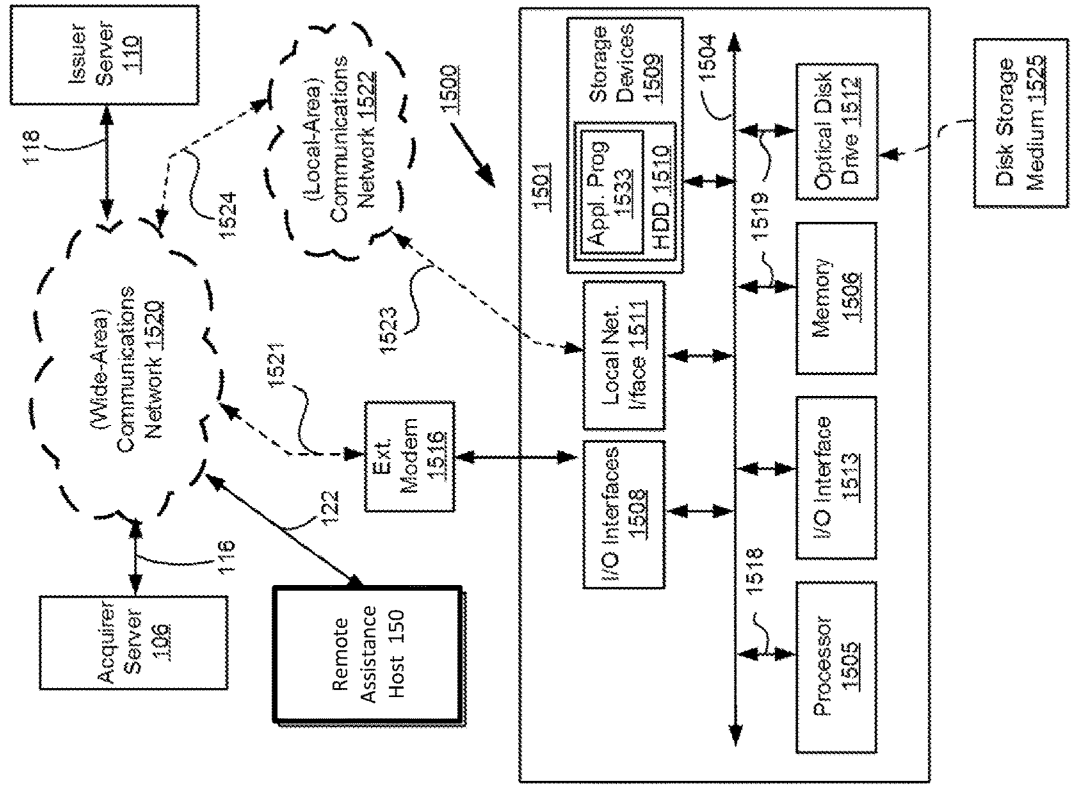
FIG. 6D is a schematic block diagram of a general purpose computer system upon which a combined travel co-ordination server and remote assistance server of FIG. 1 can be practiced.

FIG. 6C depict a general-purpose computer system 1400, upon which the remote assistance server 140 described can be practiced. The computer system 1400 includes a computer module 1401. An external Modulator-Demodulator (Modem) transceiver device 1416 may be used by the computer module 1401 for communicating to and from a communications network 1420 via a connection 1421. The communications network 1420 may be a wide-area network (WAN), such as the Internet, a cellular telecommunications network, or a private WAN. Where the connection 1421 is a telephone line, the modem 1416 may be a traditional "dial-up" modem. Alternatively, where the connection 1421 is a high capacity (e.g., cable) connection, the modem 1416 may be a broadband modem. A wireless modem may also be used for wireless connection to the communications network 1420.

The computer module 1401 typically includes at least one processor unit 1405, and a memory unit 1406. For example, the memory unit 1406 may have semiconductor random access memory (RAM) and semiconductor read only memory (ROM). The computer module 1401 also includes an interface 1408 for the external modem 1416. In some implementations, the modem 1416 may be incorporated within the computer module 1401, for example within the interface 1408. The computer module 1401 also has a local network interface 1411, which permits coupling of the computer system 1400 via a connection 1423 to a local-area communications network 1422, known as a Local Area Network (LAN). As illustrated in FIG. 6C, the local communications network 1422 may also couple to the wide network 1420 via a connection 1424, which would typically include a so-called "firewall" device or device of similar functionality. The local network interface 1411 may comprise an Ethernet circuit card, a Bluetooth® wireless arrangement or an IEEE 802.11 wireless arrangement; however, numerous other types of interfaces may be practiced for the interface 1411.

The I/O interfaces 1408 may afford either or both of serial and parallel connectivity, the former typically being implemented according to the Universal Serial Bus (USB) standards and having corresponding USB connectors (not illustrated). Storage devices 1409 are provided and typically include a hard disk drive (HDD) 1410. Other storage devices such as a floppy disk drive and a magnetic tape drive (not illustrated) may also be used. An optical disk drive 1412 is typically provided to act as a non-volatile source of data. Portable memory devices, such optical disks, USB-RAM, portable, external hard drives, and floppy disks, for example, may be used as appropriate sources of data to the system 1400.

The components 1405 to 1412 of the computer module 1401 typically communicate via an interconnected bus 1404 and in a manner that results in a conventional mode of operation of the computer system 1400 known to those in the relevant art. For example, the processor 1405 is coupled to the system bus 1404 using a connection 1418. Likewise, the memory 1406 and optical disk drive 1412 are coupled to the system bus 1404 by connections 1419. Examples of computers on which the described arrangements can be practised include IBM-PC's and compatibles, Sun Sparcstations, Apple or like computer systems.

The methods 200, 300 and 400 in FIGS. 2 to 4, respectively, where performed by the remote assistance server 140 may be implemented using the computer system 1400. The processes may be implemented as one or more software application programs 1433 executable within the computer system 1400. In particular, the sub-processes 400, 500, and 600 are effected by instructions (see corresponding component 1331 in FIG. 6B) in the software 1433 that are carried out within the computer system 1400. The software instructions may be formed as one or more code modules, each for performing one or more particular tasks. The software may also be divided into two separate parts, in which a first part and the corresponding code modules performs the methods and a second part and the corresponding code modules manage a user interface between the first part and the user.

The software may be stored in a computer readable medium, including the storage devices described below, for example. The software is loaded into the computer system 1400 from the computer readable medium, and then executed by the computer system 1400. A computer readable medium having such software or computer program recorded on the computer readable medium is a computer program product. The use of the computer program product in the computer system 1400 preferably effects an advantageous apparatus for a remote assistance server 140.

The software 1433 is typically stored in the HDD 1410 or the memory 1406. The software is loaded into the computer system 1400 from a computer readable medium, and executed by the computer system 1400. Thus, for example, the software 1433 may be stored on an optically readable disk storage medium (e.g., CD-ROM) 1425 that is read by the optical disk drive 1412. A computer readable medium having such software or computer program recorded on it is a computer program product. The use of the computer program product in the computer system 1400 preferably effects an apparatus for a remote assistance server 140.

In some instances, the application programs 1433 may be supplied to the user encoded on one or more CD-ROMs 1425 and read via the corresponding drive 1412, or alternatively may be read by the user from the networks 1420 or 1422. Still further, the software can also be loaded into the computer system 1400 from other computer readable media. Computer readable storage media refers to any non-transitory tangible storage medium that provides recorded instructions and/or data to the computer system 1400 for execution and/or processing. Examples of such storage media include floppy disks, magnetic tape, optical disc, a hard disk drive, a ROM or integrated circuit, USB memory, a magneto-optical disk, or a computer readable card such as a PCMCIA card and the like, whether or not such devices are internal or external of the computer module 1401. Examples of transitory or non-tangible computer readable transmission media that may also participate in the provision of software, application programs, instructions and/or data to the computer module 1401 include radio or infra-red transmission channels as well as a network connection to another computer or networked device, and the Internet or Intranets including e-mail transmissions and information recorded on Websites and the like.

The second part of the application programs 1433 and the corresponding code modules mentioned above may be executed to implement one or more graphical user interfaces (GUIs) to be rendered or otherwise represented upon a display. Through manipulation of typically a keyboard and a mouse, a user of the computer system 1400 and the application may manipulate the interface in a functionally adaptable manner to provide controlling commands and/or input to the applications associated with the GUI(s). Other forms of functionally adaptable user interfaces may also be implemented, such as an audio interface utilizing speech prompts output via loudspeakers and user voice commands input via a microphone.

It is to be understood that the structural context of the computer system 1400 (i.e., the remote assistance server 140) is presented merely by way of example. Therefore, in some arrangements, one or more features of the server 1400 may be omitted. Also, in some arrangements, one or more features of the server 1400 may be combined together. Additionally, in some arrangements, one or more features of the server 1400 may be split into one or more component parts.

Figure 8:
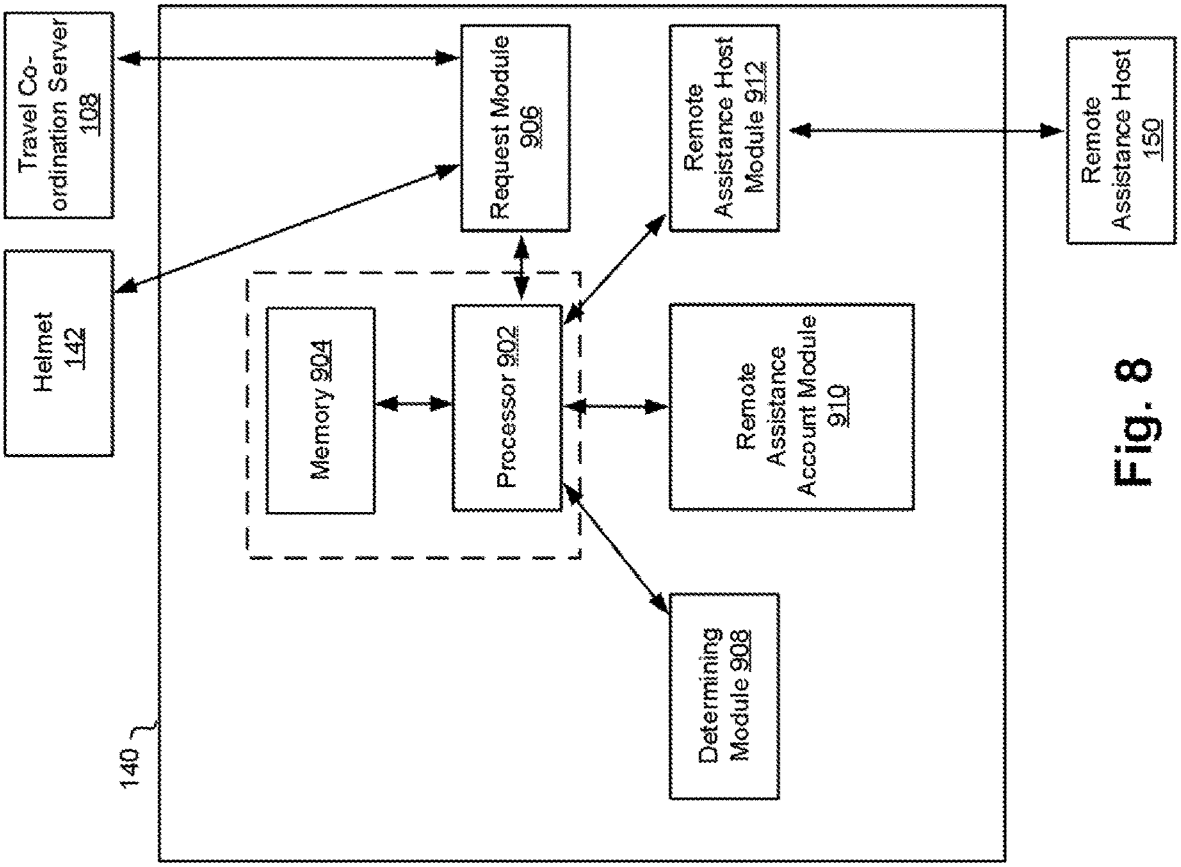
FIG. 8 shows an example of a computing device to realize the remote assistance server shown in FIG. 1.

FIG. 8 shows an alternative implementation of the remote assistance server 140 (i.e., the computer system 1400). In the alternative implementation, remote assistance server 140 may be generally described as a physical device comprising at least one processor 902 and at least one memory 904 including computer program codes. The at least one memory 904 and the computer program codes are configured to, with the at least one processor 902, cause the remote assistance server 140 to perform the operations described in the methods 200, 300 and 400. The remote assistance server 140 may also include a request module 906, a determining module 908, a remote assistance account module 910, and a remote assistance host module 912. The memory 904 stores computer program code that the processor 902 compiles to have each of the modules 906 to 912 performs their respective functions.

With reference to FIGS. 1 and 3 to 5, the request module 906 performs the function of communicating with the travel co-ordination server 108 and the helmet 142 to receive requests, such as requests to send resources to a user who has likely to have met with an accident.

With reference to FIGS. 1 and 3 to 5, the determining module 908 performs the function of determining, from a received alert signal, the remote assistance host 150 to trigger steps of a pre-configured emergency protocol such as the types of healthcare resources to send to a user based on his healthcare record.

With reference to FIGS. 1 and 3 to 5, the remote assistance account module 910 performs the function of managing (e.g., establishing, updating, etc.) the remote assistance accounts of users.

With reference to FIGS. 1 and 3 to 5, the remote assistance host module 912 performs the function of communicating with the remote assistance host 150.

The Combined Travel Co-Ordination Server 108 and Remote Assistance Server 140

FIG. 6D depict a general-purpose computer system 1500, upon which a combined travel co-ordination server 108 and remote assistance server 140 described can be practiced. The computer system 1500 includes a computer module 1501. An external Modulator-Demodulator (Modem) transceiver device 1516 may be used by the computer module 1501 for communicating to and from a communications network 1520 via a connection 1521. The communications network 1520 may be a wide-area network (WAN), such as the Internet, a cellular telecommunications network, or a private WAN. Where the connection 1521 is a telephone line, the modem 1516 may be a traditional "dial-up" modem. Alternatively, where the connection 1521 is a high capacity (e.g., cable) connection, the modem 1516 may be a broadband modem. A wireless modem may also be used for wireless connection to the communications network 1520.

The computer module 1501 typically includes at least one processor unit 1505, and a memory unit 1506. For example, the memory unit 1506 may have semiconductor random access memory (RAM) and semiconductor read only memory (ROM). The computer module 1501 also includes an interface 1508 for the external modem 1516. In some implementations, the modem 1516 may be incorporated within the computer module 1501, for example within the interface 1508. The computer module 1501 also has a local network interface 1511, which permits coupling of the computer system 1500 via a connection 1523 to a local-area communications network 1522, known as a Local Area Network (LAN). As illustrated in FIG. 6D, the local communications network 1522 may also couple to the wide network 1520 via a connection 1524, which would typically include a so-called "firewall" device or device of similar functionality. The local network interface 1511 may comprise an Ethernet circuit card, a Bluetooth® wireless arrangement or an IEEE 802.11 wireless arrangement; however, numerous other types of interfaces may be practiced for the interface 1511.

The I/O interfaces 1508 may afford either or both of serial and parallel connectivity, the former typically being implemented according to the Universal Serial Bus (USB) standards and having corresponding USB connectors (not illustrated). Storage devices 1509 are provided and typically include a hard disk drive (HDD) 1510. Other storage devices such as a floppy disk drive and a magnetic tape drive (not illustrated) may also be used. An optical disk drive 1512 is typically provided to act as a non-volatile source of data. Portable memory devices, such optical disks, USB-RAM, portable, external hard drives, and floppy disks, for example, may be used as appropriate sources of data to the system 1500.

The components 1505 to 1512 of the computer module 1501 typically communicate via an interconnected bus 1504 and in a manner that results in a conventional mode of operation of the computer system 1500 known to those in the relevant art. For example, the processor 1505 is coupled to the system bus 1504 using a connection 1518. Likewise, the memory 1506 and optical disk drive 1512 are coupled to the system bus 1504 by connections 1519. Examples of computers on which the described arrangements can be practised include IBM-PC's and compatibles, Sun Sparcstations, Apple or like computer systems.

The steps of the methods 200A and 200B in FIGS. 2A and 2B, respectively, performed by the travel co-ordination server 108; and methods 300 and 400 in FIGS. 3 to 4, respectively, performed by the remote assistance server 140 may be implemented using the computer system 1500. The steps of the methods 200A and 200B as performed by the travel co-ordination server 108 and methods 300 and 400 may be implemented as one or more software application programs 1533 executable within the computer system 1500. In particular, the steps of the methods 200A, 200B and methods 300 and 400 are effected by instructions (see corresponding component 1331 in FIG. 6B) in the software 1533 that are carried out within the computer system 1500. The software instructions may be formed as one or more code modules, each for performing one or more particular tasks. The software may also be divided into two separate parts, in which a first part and the corresponding code modules performs the steps of the methods 200A, 200B and methods 300 and 400 and a second part and the corresponding code modules manage a user interface between the first part and the user.

The software may be stored in a computer readable medium, including the storage devices described below, for example. The software is loaded into the computer system 1500 from the computer readable medium, and then executed by the computer system 1500. A computer readable medium having such software or computer program recorded on the computer readable medium is a computer program product. The use of the computer program product in the computer system 1500 preferably effects an advantageous apparatus for a combined travel co-ordination server 108 and remote assistance server 140.

The software 1533 is typically stored in the HDD 1510 or the memory 1506. The software is loaded into the computer system 1500 from a computer readable medium, and executed by the computer system 1500. Thus, for example, the software 1533 may be stored on an optically readable disk storage medium (e.g., CD-ROM) 1525 that is read by the optical disk drive 1512. A computer readable medium having such software or computer program recorded on it is a computer program product. The use of the computer program product in the computer system 1500 preferably effects an apparatus for a combined travel co-ordination server 108 and remote assistance server 140.

In some instances, the application programs 1533 may be supplied to the user encoded on one or more CD-ROMs 1525 and read via the corresponding drive 1512, or alternatively may be read by the user from the networks 1520 or 1522. Still further, the software can also be loaded into the computer system 1500 from other computer readable media. Computer readable storage media refers to any non-transitory tangible storage medium that provides recorded instructions and/or data to the computer system 1500 for execution and/or processing. Examples of such storage media include floppy disks, magnetic tape, optical disc, a hard disk drive, a ROM or integrated circuit, USB memory, a magneto-optical disk, or a computer readable card such as a PCMCIA card and the like, whether or not such devices are internal or external of the computer module 1501. Examples of transitory or non-tangible computer readable transmission media that may also participate in the provision of software, application programs, instructions and/or data to the computer module 1501 include radio or infra-red transmission channels as well as a network connection to another computer or networked device, and the Internet or Intranets including e-mail transmissions and information recorded on Websites and the like.

The second part of the application programs 1533 and the corresponding code modules mentioned above may be executed to implement one or more graphical user interfaces (GUIs) to be rendered or otherwise represented upon a display. Through manipulation of typically a keyboard and a mouse, a user of the computer system 1500 and the application may manipulate the interface in a functionally adaptable manner to provide controlling commands and/or input to the applications associated with the GUI(s). Other forms of functionally adaptable user interfaces may also be implemented, such as an audio interface utilizing speech prompts output via loudspeakers and user voice commands input via a microphone.

It is to be understood that the structural context of the computer system 1500 (i.e., the remote assistance server 140) is presented merely by way of example. Therefore, in some arrangements, one or more features of the server 1500 may be omitted. Also, in some arrangements, one or more features of the server 1500 may be combined together. Additionally, in some arrangements, one or more features of the server 1500 may be split into one or more component parts.

Figure 9:
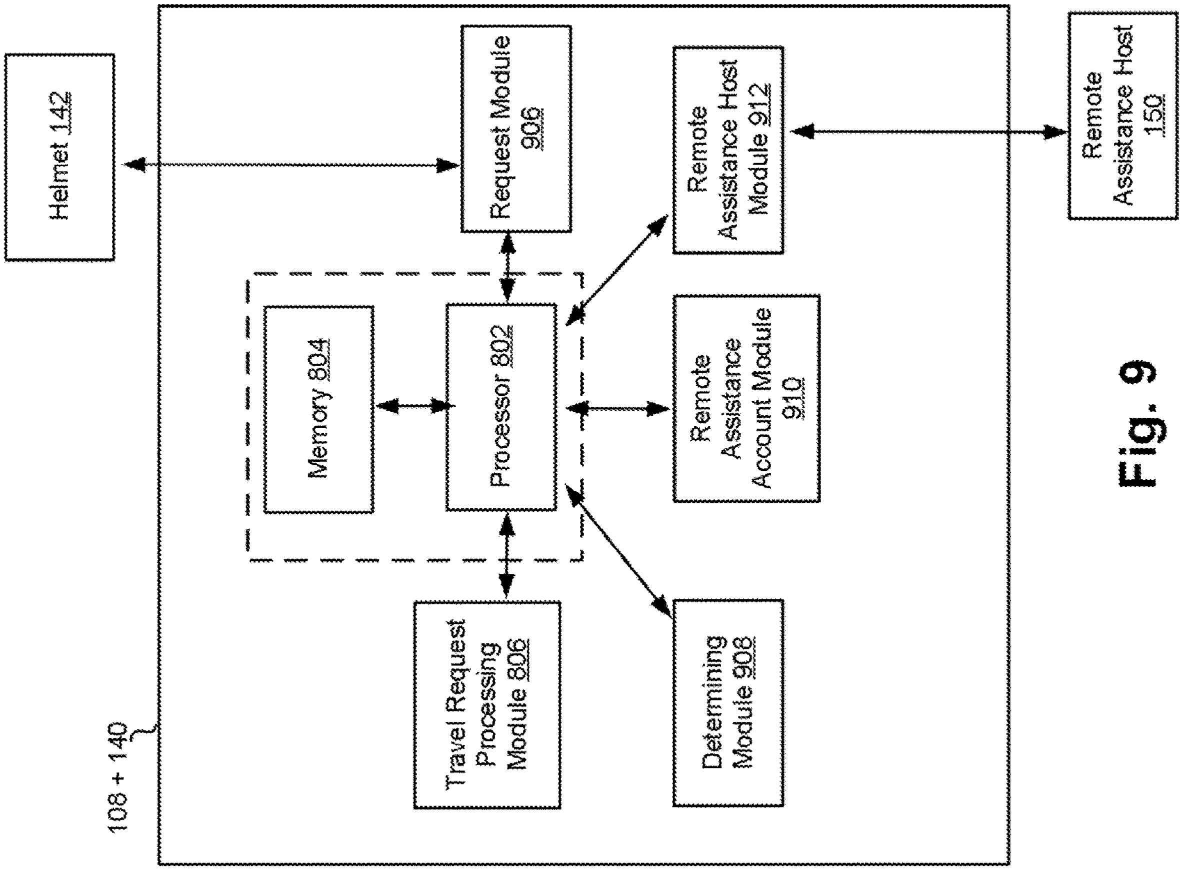
FIG. 9 shows an example of a computing device to realize a combined travel co-ordination and remote assistance server shown in FIG. 1.

FIG. 9 shows an alternative implementation of the combined travel co-ordination server 108 and remote assistance server 140 (i.e., the computer system 1500). In the alternative implementation, the combined travel co-ordination server 108 and remote assistance server 140 may be generally described as a physical device comprising at least one processor 1002 and at least one memory 904 including computer program codes. The at least one memory 1004 and the computer program codes are configured to, with the at least one processor 1002, cause the combined travel co-ordination server 108 and remote assistance server 140 to perform the operations described in the steps of the methods 200A, 200B, 300 and 400. The combined travel co-ordination server 108 and remote assistance server 140 may also include a transaction request processing module 806, a alert signal module 808, a request module 906, a determining module 908, a remote assistance account module 910, and a remote assistance host module 912. The memory 1004 stores computer program code that the processor 1002 compiles to have each of the modules 806 to 912 performs their respective functions.

With reference to FIGS. 1, 2A, and 2B, the request (or travel request) processing module 806 performs the function of communicating with the requestor device 102 and the provider device 104; and the acquirer server 106 and the issuer server 110 to respectively receive and transmit a travel request message.

With reference to FIGS. 1 and 3 to 5, the request module 906 performs the function of communicating with the travel co-ordination server 108 and the helmet 142 to receive requests, such as requests to send resources to a user who has likely to have met with an accident.

With reference to FIGS. 1 and 3 to 5, the determining module 908 performs the function of determining, from a received alert signal, the remote assistance host 150 to trigger steps of a pre-configured emergency protocol such as the types of healthcare resources to send to a user based on his healthcare record.

With reference to FIGS. 1 and 3 to 5, the remote assistance account module 910 performs the function of managing (e.g., establishing, updating, etc.) the remote assistance accounts of users.

With reference to FIGS. 1 and 3 to 5, the proof of provenance host module 912 performs the function of communicating with the proof of provenance host 150.

INDUSTRIAL APPLICABILITY

The arrangements described are applicable to the computer and data processing industries and particularly for the fields of road traffic management and healthcare resource allocation.

The foregoing describes only some embodiments of the present invention, and modifications and/or changes can be made thereto without departing from the scope and spirit of the invention, the embodiments being illustrative and not restrictive.

The invention claimed is:

1. A helmet for detecting a likelihood of an accident, comprising:

a sensor configured to detect a signal relating to a user wearing the helmet, the signal including information at a point in time for the user, an input sensor;

a communication device in communication with a remote server, a processor configured to communicate with the sensor, the input sensor and the communication device to:

receive information identifying a travel request involving a trip to a destination;

detect a signal indicative of a start of the trip generated by the input sensor, determine, during the trip to the destination, that there is a likelihood of an accident having occurred in response to receiving the signal relating to the user wearing the helmet during the trip to the destination;

generate an alert signal in response to the determination, the alert signal indicating there is the likelihood of the accident; and transmit the alert signal to the remote server.

2. The helmet according to claim 1, wherein the alert signal is triggered by an input received at least via a button that is located on the helmet or an application running on a device.

3. The helmet according to claim 1, further comprising:

a recorder configured to record an audio message in response to the receipt of the signal indicative of the start of a trip.

4. The helmet according to claim 3, wherein the recorder is configured to continue recording an audio message in response to the generation of the alert signal.

5. The helmet according to claim 1, wherein the processor is further configured to encrypt the audio message and send the encrypted audio message to a server.

6. The helmet according to claim 1, wherein the sensor comprises a navigation sensor that is configured to detect location information and time information of the user, the information included in the signal comprises the location information and the time information of the user.

7. The helmet according to claim 1, wherein the sensor comprises a gyroscope sensor configured to detect location orientation and angular velocity of the user.

8. The helmet according to claim 1, further comprising at least a proximity sensor to detect if the helmet is worn properly.

9. The helmet according to claim 1, further comprising a noise cancelling module to cancel noise that is included in the recorded audio message.

10. The helmet according to claim 9, further comprising a transmitter that is configured to transmit at least one of the recorded audio message and alert signal wirelessly.

11. A method of detecting a likelihood of an accident, comprising:

receiving information identifying a travel request involving a trip to a destination involving at least a first user;

detecting, by a sensor, a signal relating to the at least a first user wearing a helmet, the signal including information at a point in time for the user;

determining, by a processor, that there is a likelihood of an accident during the trip to the destination in response to receiving the signal relating to the at least first user wearing the helmet during the trip to the destination; and generating, by the processor, an alert signal in response to the determination, wherein the sensor and the processor are located on the helmet;

wherein the method further comprises detecting, by an input sensor, a signal indicative of a start of the trip by the user.

12. The method according to claim 11, further comprising:

receiving an input, the input being received at least via a button that is located on the helmet or an application running on a device, wherein the alert signal is triggered by the input.

13. The method according to claim 11, further comprising:

recording an audio message in response to the receipt of the signal indicative of the start of a trip.

14. The method according to claim 13, further comprising:

transmitting at least one of the recorded audio message and alert signal wirelessly.

15. A method of detecting a likelihood of an accident of a user wearing a helmet, comprising:

receiving information identifying a travel request involving a trip to a destination involving the user;

receiving, by a server, an alert signal indicating that there is a likelihood of an accident during the trip to the destination during the trip to the destination, the alert signal being determined based on a signal relating to the user wearing the helmet during the trip to the destination; and sending, by the server, a request message requesting assistance to the user, wherein the server is at least one of travel co-ordination server or a remote assistance server;

wherein the method further comprises detecting, by an input sensor, a signal indicative of a start of the trip by the user.

16. The method according to claim 15, further comprising:

sending resources to a location identified by location information included in the signal.

17. The method according to claim 15, further comprising:

updating a database in response to receiving the alert signal.

* * * * *